United States Patent [19]
Sugiyama et al.

[11] Patent Number: 6,137,575
[45] Date of Patent: Oct. 24, 2000

[54] FILM THICKNESS MEASURING METHOD AND APPARATUS

[75] Inventors: Yasushi Sugiyama, Minamikawachimachi; Mikichi Ban, Hagamachi; Takehiko Suzuki, Satsute; Masaru Nyui, Utsunomiya, all of Japan

[73] Assignee: Canon Kabushiki Kaisha, Tokyo, Japan

[21] Appl. No.: 09/177,486

[22] Filed: Oct. 23, 1998

[30] Foreign Application Priority Data

Oct. 24, 1997 [JP] Japan .................................. 9-309797
Oct. 24, 1997 [JP] Japan .................................. 9-309798

[51] Int. Cl.$^7$ .................................................. G01B 9/02
[52] U.S. Cl. .......................................... 356/357; 356/351
[58] Field of Search .................................... 356/346, 357, 356/359, 351

[56] References Cited

U.S. PATENT DOCUMENTS

| | | | |
|---|---|---|---|
| 4,850,709 | 7/1989 | Ban et al. ............................. | 356/352 |
| 5,754,294 | 5/1998 | Jones et al. ............................. | 356/357 |
| 5,856,871 | 1/1999 | Cabib et al. ............................. | 356/357 |

*Primary Examiner*—Robert H. Kim
*Attorney, Agent, or Firm*—Fitzpatrick, Cella, Harper & Scinto

[57] ABSTRACT

A method and apparatus for measuring the thickness of a film layer provided on a predetermined surface includes a step and device for detecting light reception signals of interference light of different wavelengths generated when light illuminates the film layer on the predetermined surface, a step or device for performing a first process for obtaining an approximate value for the film thickness by selecting a combination of solutions with the closest values from among solutions for the film thickness obtainable from at least three of the light reception signals corresponding to the respective wavelengths, and a step or device for performing a second process for obtaining an exact value for the film thickness by selecting a combination of solutions with the closest values from among solutions for the film thickness obtainable from all the light reception signals corresponding to the respective wavelengths. The second process is performed on the basis of the approximate value and with a restricted range for selection of the combination.

31 Claims, 16 Drawing Sheets

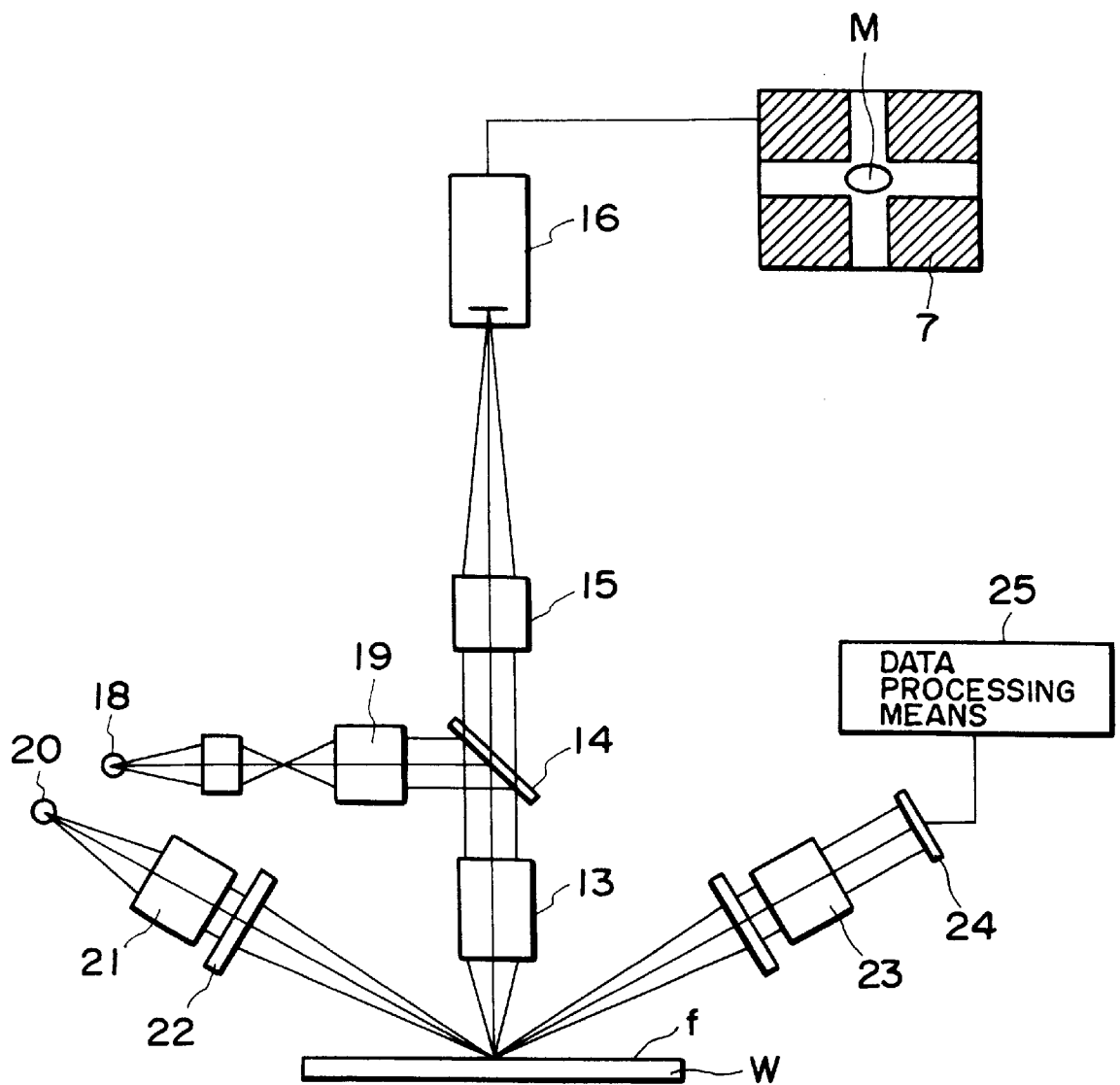
FIG. IB

FILM THICKNESS MEASURING METHOD AND APPARATUS

FIELD OF THE INVENTION AND RELATED ART

This invention relates to a film thickness measuring method and apparatus for measuring the thickness of a film layer provided on a substrate.

For optical measurement of the thickness of a film layer provided on a substrate, there are the interference spectral reflectivity method and the polarization analysis method.

FIG. 1A shows the structure of a known example of an interference spectral reflectivity system. Disposed along the light path after a white light source 1 are two condenser lenses 2 and a half mirror 3. An objective lens 4 is disposed in the direction of reflection by the half mirror 3. These components provide an illumination system. Disposed below the objective lens 4 is a substrate W having a film layer f formed on its surface. In the direction of transmission by the half mirror 3, there is an imaging optical system, which comprises an imaging lens 5, a half mirror 6 and an observation TV camera 7. The output of the camera 7 is connected to a TV monitor 8. In the direction of reflection by the half mirror 6, there are a pinhole member 9 for a spectroscope, a diffraction grating 10 with a concave surface, and a one-dimensional linear sensor 11 optically conjugate with the pinhole member 9. The output of the linear sensor 11 is connected to data processing means 12. Disposed adjacent to the pinhole 9 is an LED light source 13 for illuminating the pinhole 9.

Light emitted from the white light source 1 of the illumination optical system goes through the condenser lenses 2 and enters the imaging optical system. It is reflected by the half mirror 3 and, after passing through the objective lens 4, it is projected at a predetermined position on the substrate W surface. Reflection light from this predetermined position passes again the objective lens 4 of the imaging optical system, and goes through the half mirror 3 and the imaging lens 5. The light is then received by the half mirror 6, by which a portion of the light is projected on the imaging surface of the observation TV camera 7 for observation of the substrate W surface while the other portion is projected on the pinhole 9 for the spectroscope.

Initially, for determination of the position where the film thickness measurement for the film layer f on the substrate W surface is to be performed, the pinhole 9 is illuminated by the LED light source 13, and through the imaging optical system an image P of the pinhole is imaged on the substrate W surface. Then, from the picture in the TV monitor 8, the position for film thickness measurement within the pattern on the substrate W surface is determined, and the pinhole image P is brought into registration with this position. This is the alignment of the film thickness measuring apparatus.

The light impinging on the pinhole 9 is divided by the diffraction grating 10 into different wavelengths, and the spectrally divided light is then received by the linear sensor 11. The spectral intensity with respect to different wavelengths is detected in relation to the picture elements of the linear sensor 11, and the data processing means calculates the film thickness on the basis of the detection signal from the sensor.

According to the spectral reflectivity method, the film thickness measurement is performed as follows. The spectral reflection characteristic of light reflected by the film layer is measured. A table of correlation between the film thickness value and the spectral reflectivity as calculated theoretically in relation to the film thickness value and with respect to different wavelengths, is prepared. A least square sum of the difference between the spectral reflectivity as actually measured with respect to each wavelength and the spectral reflectivity calculated on the basis of the correlation table, is determined. The thickness of the film layer is then calculated, from the combination with which the least square sum becomes smallest.

FIG. 1B shows the structure of a known example of a polarization analysis system. The positioning system for determining the film thickness measurement position is disposed perpendicularly above a substrate W. Disposed opposed to the substrate W is an objective lens 13. Along the light path above the objective lens 13, there are a half mirror 14, an imaging lens 15 and an observation TV camera 16. These components provide an imaging optical system. The output of the camera 16 is connected to a TV monitor 17. Disposed in the direction of reception of light by the half mirror 14 is an illumination optical system, which comprises a white light source 18 and a condenser lens 19.

The film thickness measuring apparatus is disposed along a light path which is inclined with respect to the substrate W. It comprises a white light source 20, a condenser lens 21 and a polarizer 22 disposed in this order, to provide an illumination optical system. Also, along the light path in an inclined direction of advancement of reflection light from the substrate W, there are a rotational analyzer 23 and a light receiving element 24, which provide an imaging optical system. The output of the light receiving element 24 is connected to data processing means 25.

Light emitted from the white light source 18 of the positioning system travels via the condenser lens 19, the half mirror 14 and the objective lens 13, and it illuminates the substrate W. Reflection light from the substrate W travels via the objective lens 13, the half mirror 14 and the imaging lens 15, and it is imaged upon the observation TV camera 16. Within the video image of the monitor 17, a mark M, which shows the minimum spot imaging position for film thickness measurement according to polarization analysis, is displayed by superimposition. From the picture in the TV monitor 17, the operator determines the position for film thickness measurement within the pattern on the substrate W, and the superimposed mark M is brought into registration with this position. This is the alignment of the film thickness measuring apparatus.

The light emitted from the white light source 20 of the film thickness measuring apparatus goes through the condenser lens 21 and, by means of the polarizer 22, it is transformed into rectilinearly polarized light having a polarization direction of 45 deg. It is then projected at a predetermined position on the substrate W surface with a predetermined incidence angle and is imaged to define a minimum spot.

Reflection light from this predetermined position comprises elliptically polarized light due to the structure of the film layer f, and this reflection light passes through the rotational analyzer 23, which can be set in different directions. Then, the light is received by the light receiving element 24, by which the intensities of respective light beams are detected. From the thus measured values, in the data processing means 25, a reflection amplitude ratio, and a phase difference of P and S polarization components, representing the state of elliptically polarized light, are analyzed. Then, on the basis of a correlation table for the correlation of the film thickness value and the reflection amplitude ratio and the phase difference of P and S polarization components calculated theoretically with respect to the film thickness values, the result of analysis is referred to, whereby the thickness of the film layer f is calculated.

SUMMARY OF THE INVENTION

It is an object of the present invention to provide an improved film thickness measuring method and/or apparatus by which film thickness measurement can be performed with higher precision and/or in shorter time.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1B is a schematic view of a known example of a film thickness measuring apparatus according to a polarization analysis method.

DESCRIPTION OF THE PREFERRED EMBODIMENTS

Figure 1A:
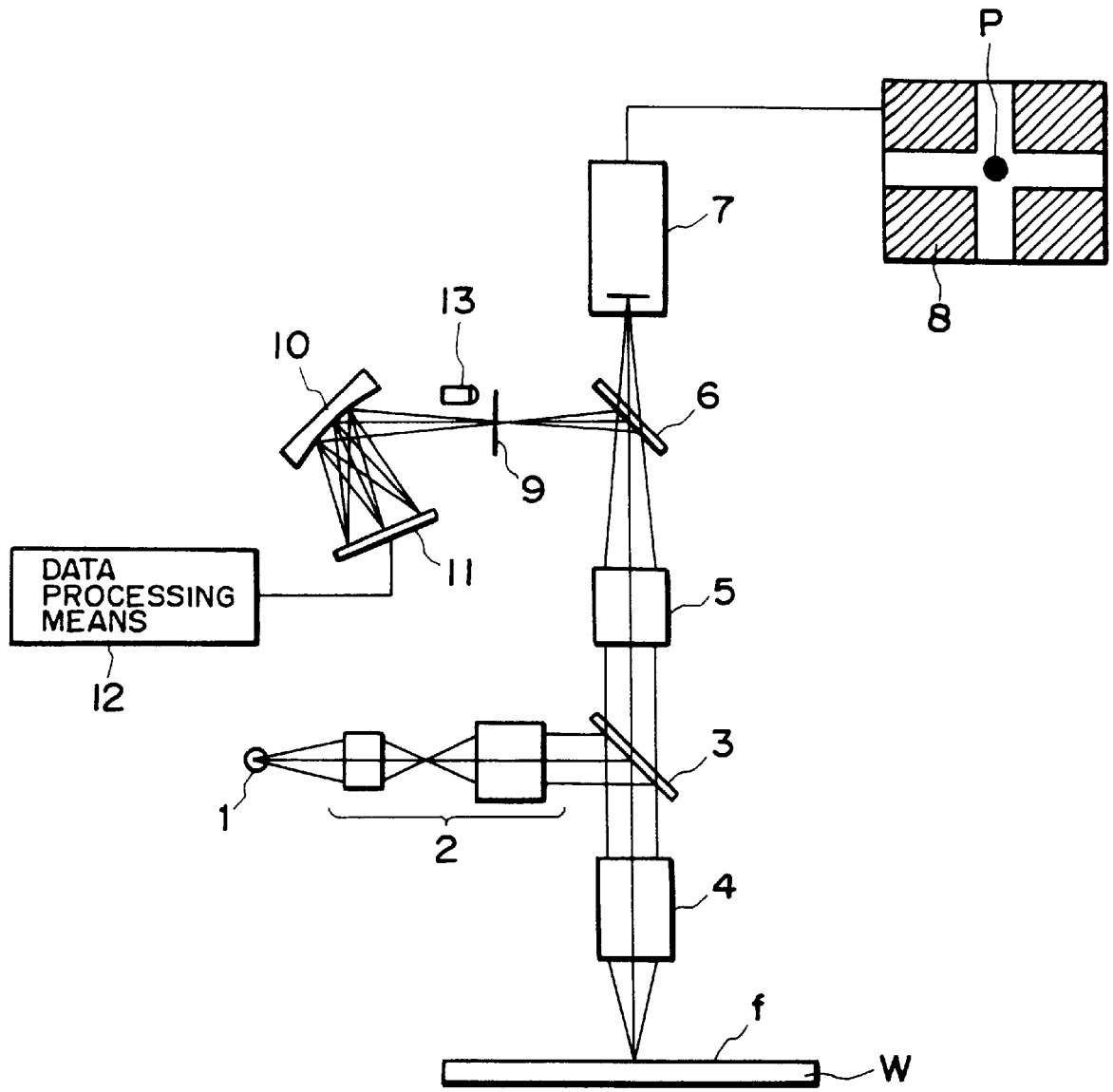
FIG. 1A is a schematic view of a known example of a film thickness measuring apparatus according to an interference spectral reflectivity method.

The invention will be described in greater detail, in conjunction with preferred embodiments shown in the drawings.

Figure 2A:
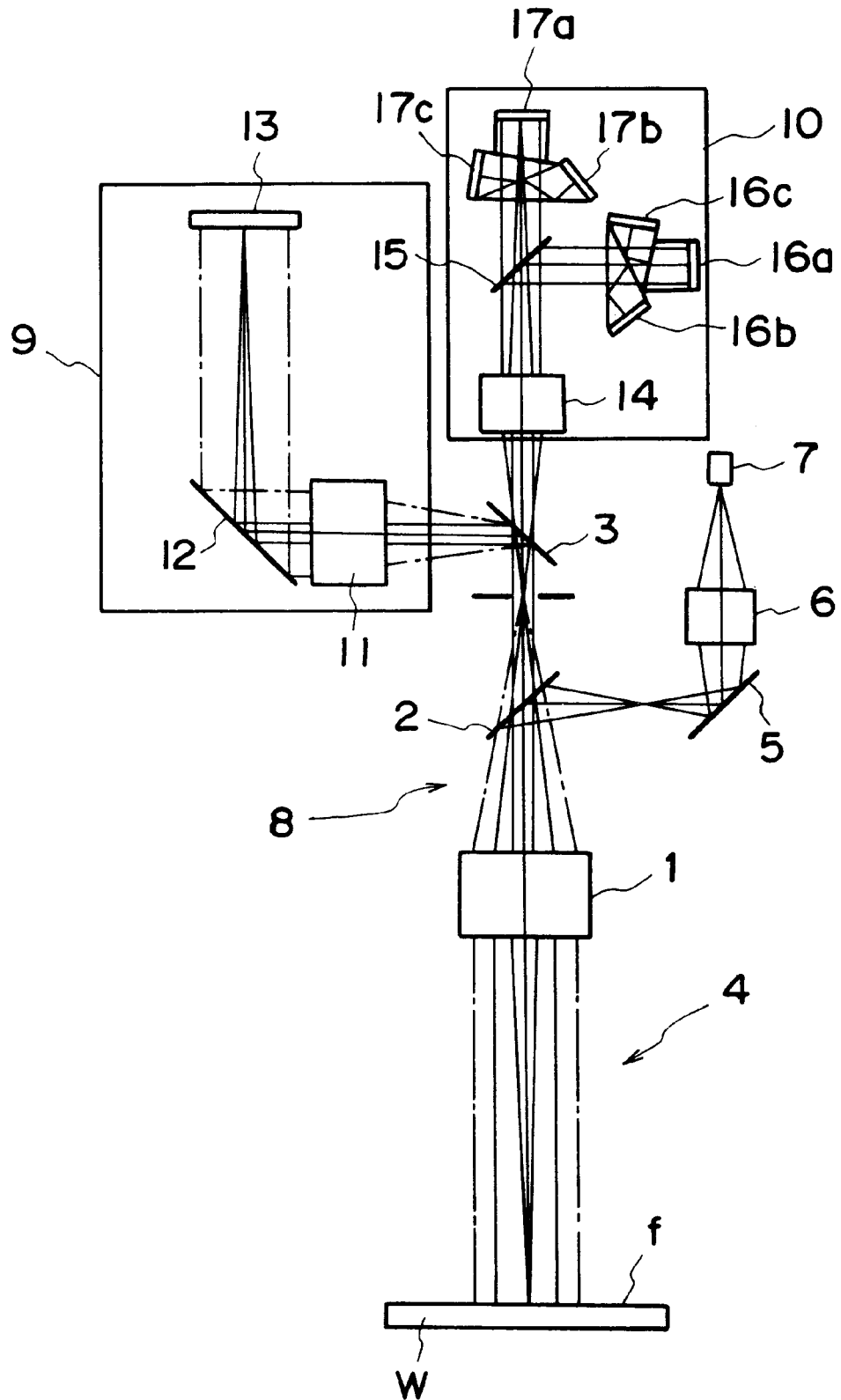
FIG. 2A is a schematic view of a film thickness measuring apparatus according to an embodiment of the present invention.

FIG. 2A is a schematic view of a film thickness measuring apparatus according to a first embodiment of the present invention. A substrate W has a film layer f formed on its surface, and it is moved by driving means (not shown). Disposed above the substrate W is an objective lens 1. Along the light path above the objective lens 1, there are a first half mirror 2 and a second half mirror 3 which are disposed in this order. In the direction of light reception by the first half mirror 2, there is an illumination optical system 4, which comprises a mirror 5, a condenser lens 6 and an optical fiber 7, which is connected to a white light source (not shown). The optical fiber 7 has its light exit surface disposed at a position optically conjugate with the exit pupil of the objective lens 1.

In the direction of light transmission by the first half mirror 2, there is an imaging optical system 8. The imaging optical system 8 is branched from the second half mirror 3. In the direction of light reflection by the half mirror 3, there is a position detecting system 9 for detecting a predetermined region on the substrate W surface. In the direction of light transmission, on the other hand, there is a film thickness measuring system 10 for measuring the thickness of the film.

Figure 2B:
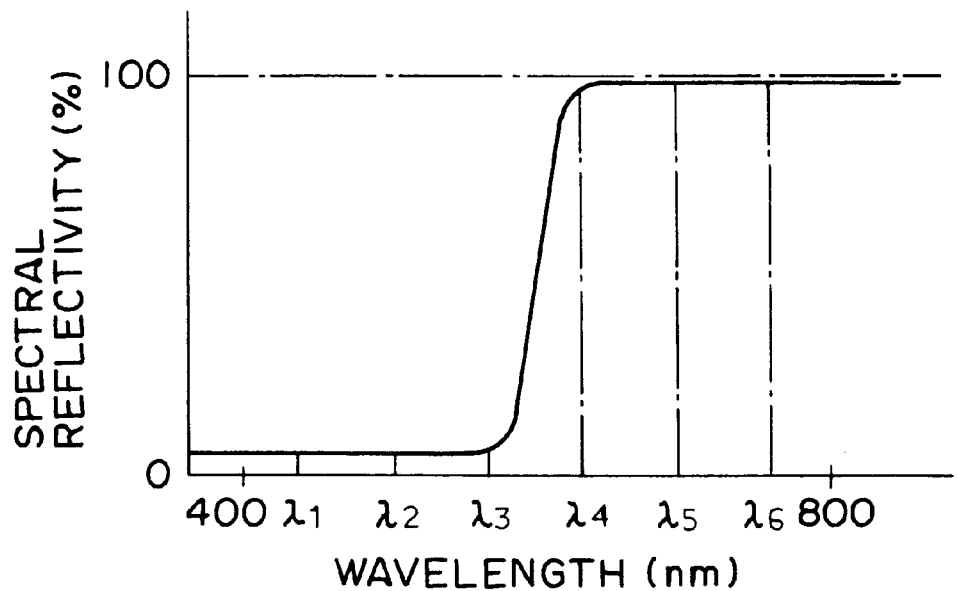
FIG. 2B is a graph of spectral reflectivity.

The position detecting system 9 comprises an imaging lens 11, a mirror 12, and a CCD light receiving element 13 of a two-dimensional array. On the other hand, the film thickness measuring system 10 comprises an imaging lens 14 and a dichroic mirror 15 which has a characteristic such as shown in FIG. 2B, for separating a first wavelength region, including wavelengths $\lambda_i$ (i=1 to 3), and a second wavelength region, including wavelengths $\lambda_i$ (i=4 to 6), from each other. In the direction of light reflection by the dichroic mirror 15, there is a tricolor separation optical element having CCD light receiving elements 16a, 16b and 16c of a two-dimensional array, for separately receiving the wavelengths $\lambda_i$ (i=1 to 3) in the first wavelength region. In the direction of light transmission by the dichroic mirror 15, there is a similar tricolor separation optical element having CCD light receiving elements 17a, 17b and 17c of a two-dimensional array, for separately receiving the wavelengths $\lambda_i$ (i=4 to 6) of the second wavelength region.

The light emitted from the white light source is directed by the optical fiber 7 into the illumination optical system and, through the condenser lens 6, mirror 5, half mirror 3 and objective lens 1, it is projected on the film layer f within a predetermined region on the substrate W surface, substantially at a right incidence angle.

The light reflected by the surface of the film layer f and the light reflected by the bottom of the film layer f, which is the interface with the substrate W surface, are directed to the imaging optical system 8 including the objective lens 1 and imaging lenses 11 and 14. In the imaging optical system 8, the light reflected from the surface of the film layer f is branched by the half mirror 3. Within the position detecting system 9, it goes via the imaging lens 11 and the mirror 12, and it is imaged upon the CCD light receiving element 13 of a two-dimensional array. A corresponding two-dimensional video image is displayed in a monitor, not shown.

Figure 3:
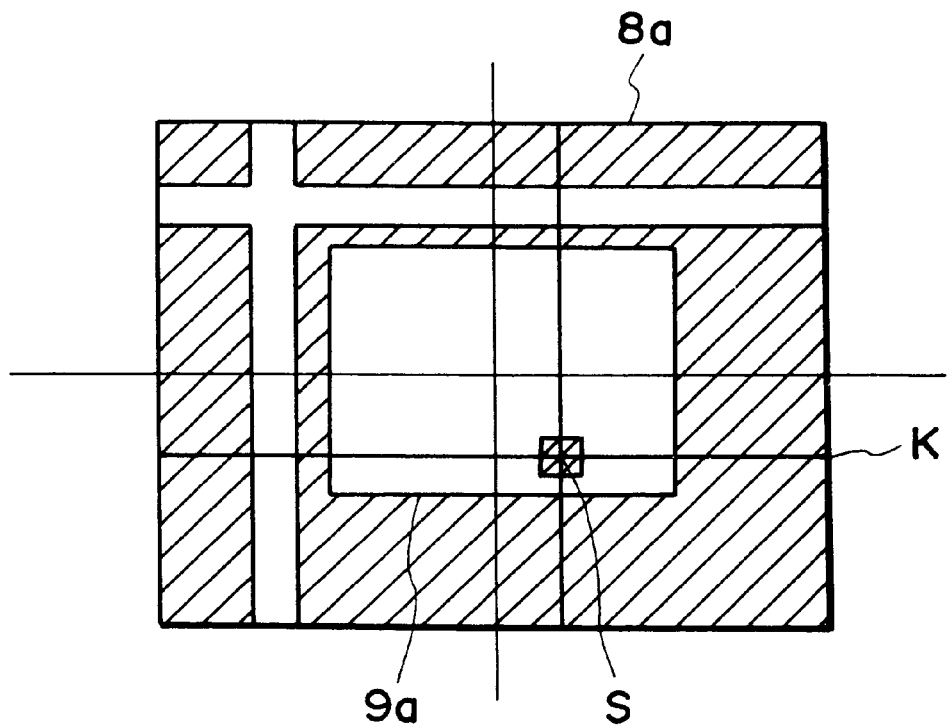
FIG. 3 is a schematic view for explaining a two-dimensional imagewise information range.

FIG. 3 shows a two-dimensional image in the monitor. By moving the cursor K displayed within the video image, for example, a position (Xm, Ym) or a region S, suitable for film thickness measurement, is determined.

Subsequent to the above-described position detecting process, in the imaging optical system 8, the light passed through the half mirror 3 goes through the imaging lens 14 of the film thickness measuring system 10. By means of the dichroic mirror 15, it is separated into first and second wavelength regions. The path for the first wavelength region is divided separately for three wavelengths $\lambda_i$ (i=1 to 3), respectively. Also, the path for the second wavelength region is divided separately for three wavelengths $\lambda_i$ (i=4 to 6), respectively. Then, through respective tricolor separation optical elements, the lights are imaged upon the CCD light receiving elements 16a, 16b and 16c and similarly upon the CCD light receiving elements 17a, 17b and 17c, respectively.

Figure 4:
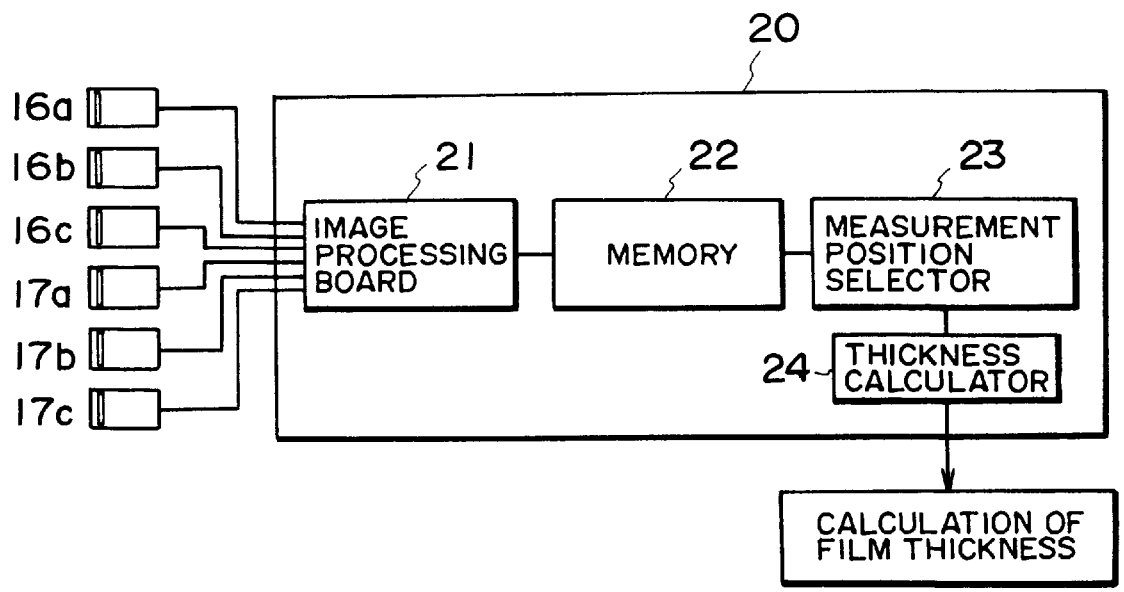
FIG. 4 is a block diagram of information processing in a film thickness measuring system.

FIG. 4 is a block diagram of data processing in the film thickness measuring system 10. The outputs of the CCD light receiving elements 16a–16c and 17a–17c are connected to an image processing board 21 of a host computer 20, a film thickness measurement image memory 22 of external storing means, a film thickness measurement suitable position selecting device 23 of image processing means, and a film thickness measurement and calculating device 24, sequentially in this order, whereby the film thickness is calculated.

Light beams of wavelengths $\lambda_i$ (i=1 to 6) as received by the CCD light receiving elements 16a–16c and 17a–17c, respectively, have inherent interference spectral reflection intensities, respectively, corresponding to the thickness of the film layer f. The interference spectral reflection intensities of respective wavelengths are stored, through the image processing board 21 of the film thickness measuring process, into the film thickness measurement image memory 22 of the external storing device of the host computer 20, in two-dimensional form.

Subsequently, from the two-dimensional imagewise information thus stored in relation to respective wavelengths, and on the basis of the position (Xm, Ym) or the coordinates of the region S suitable for film-thickness measurement, as determined in the position detecting process, the film thickness measurement calculator 24 calculates the film thickness by using light reception signals from corresponding picture elements.

In the film thickness measurement and calculating device 24, in a first step, light reception signals corresponding to at least three of the above-described wavelengths are used to calculate solutions for film thickness with respect to these wavelengths, respectively. Then, among these solutions, a combination of solutions for film thickness, having the closest values, is selected, and the film thickness value of the film layer is roughly determined on the basis of the thus selected combination of film thickness solutions.

Then, in a second step, light reception signals corresponding to all the wavelengths are used to calculate solutions for film thickness with respect to the respective wavelengths, in a similar manner in the first step. By using the roughly determined film thickness, obtained in the first step, as a reference, among the calculated solutions a combination of solutions of film thickness with the closest values is selected. On the basis of the thus selected combination, the film thickness is determined exactly.

Figure 5:
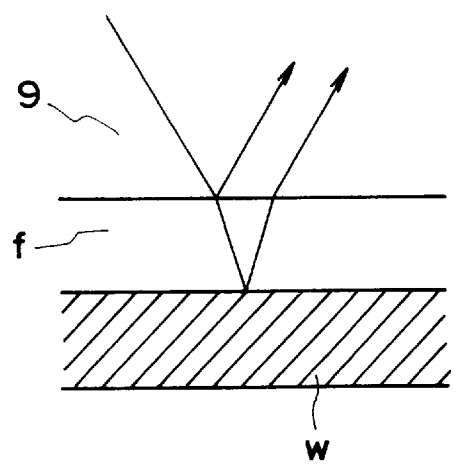
FIG. 5 is a schematic view for explaining the reflection of light.
Figure 6:
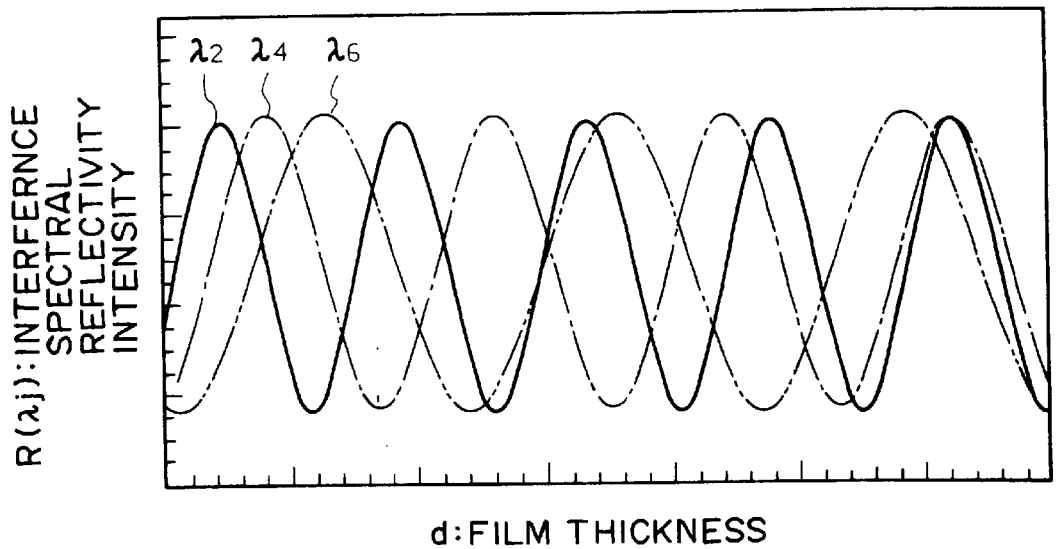
FIG. 6 is a graph of interference spectral intensity.

FIG. 5 shows the state of reflection light at the film thickness measurement. FIG. 6 shows the relation between interference spectral reflection intensity and film thickness. At a first step, three of the wavelengths $\lambda_i$ (i=1 to 6), that is, for example, the wavelengths $\lambda_2$, $\lambda_4$ and $\lambda_6$, are selected. The interference spectral reflection intensities with respect to these wavelengths, that is, reference outputs $R(\lambda_i)$ (i=2, 4, 6) of light reception signals in relation to the wavelengths, can be expressed by the following equation:

$$R(\lambda_i)=\{(\gamma^2+\rho^2+\gamma\rho\ \cos(\phi+\delta)\}/\{1+\gamma^2\rho^2+2\gamma\rho\ \cos(\phi+\delta)\}$$

γ: Fresnel reflection coefficient at interface between air layer a and film layer f ρ: Fresnel reflection coefficient at interface between film layer f and substrate W φ: phase shift due to reflection at interface between film layer f and substrate W δ: phase difference of light reflected by interface between air layer a and film layer f, and interface between film layer f and substrate W Here, six wavelengths $\lambda_i$ (i=1 to 6) to be used in this process and including three wavelengths to be selected, are so set that the reference outputs $R(\lambda_i)$ of interference spectral reflection intensities have different variation periods.

From two-dimensional imagewise information measured with respect to these three wavelengths, a light reception signal $R'(\lambda_i)$, corresponding to a picture element of an average of imagewise signals in the region S or at the position (Xm, Ym) suitable for the film thickness measurement selected and determined in the position detecting process, is detected. For a determination of film thickness value $d_i$ with respect to each wavelength, equation (1) is modified by using the refractive index n of the film layer and an integer N, as follows:

$$d_i=\{\lambda_i/(4\pi n)\}\{-\phi+2N\pi+\cos^{-1}(A/B)\} \quad (2)$$

where $$A=\gamma^2+\rho^2-(1+\gamma^2\rho^2)R'(\lambda_i)$$

$$B=2\gamma\rho\{R'(\lambda_i)-1\}$$

Here, within the film thickness measurement range of the film f upon the substrate W and depending on the value of N taken, plural solutions for film thickness $d_{iN}$ may be produced. Table 1 below shows the film thickness value $d_{iN}$ as calculated by the film thickness measuring and calculating means 24 on the basis of three measured light reception signals $R'(\lambda_i)$.

TABLE 1

| N  | R' ($\lambda_{2N}$) | R' ($\lambda_{4N}$) | R' ($\lambda_{6N}$) |
|----|---------|---------|---------|
| 1  | $d_{21}$ | $d_{41}$ | $d_{61}$ |
| 2  | $d_{22}$ | $d_{42}$ | $d_{62}$ |
| 3  | $d_{23}$ | $d_{43}$ | $d_{63}$ |
| 4  | $d_{24}$ | $d_{44}$ | $d_{64}$ |
| 5  | $d_{25}$ | $d_{45}$ | $d_{65}$ |
| 6  | $d_{26}$ | $d_{46}$ | $d_{66}$ |
| 7  | $d_{27}$ | $d_{47}$ | $d_{67}$ |
| 8  | $d_{28}$ | $d_{48}$ | $d_{68}$ |
| 9  | $d_{29}$ | $d_{49}$ | $d_{69}$ |
| 10 | $d_{210}$ | $d_{410}$ | $d_{610}$ |

TABLE 1-continued

| N | R' ($\lambda_{2N}$) | R' ($\lambda_{4N}$) | R' ($\lambda_{6N}$) |
|---|---|---|---|
| 11 | $d_{211}$ | $d_{411}$ | $d_{611}$ |
| 12 | $d_{212}$ | $d_{412}$ | $d_{612}$ |
| 13 | $d_{213}$ | $d_{413}$ | $d_{613}$ |
| 14 | $d_{214}$ | $d_{414}$ | $d_{614}$ |
| 15 | $d_{215}$ | $d_{415}$ | $d_{615}$ |
| 16 | $d_{216}$ | $d_{416}$ | $d_{616}$ |
| ... | ... | ... | ... |

Regarding $d_{2N}$, $d_{4N}$ and $d_{6N}$ in Table 1, a combination with which the least square sum of mutual difference becomes smallest is detected in accordance with the following equation:

$$V(a, b, c) = (d_{2a} - d_{4b})^2 + (d_{2a} - d_{6c})^2 + (d_{4b} - d_{6c})^2 \quad (3)$$

From $d_{2a}$, $d_{4b}$ and $d_{6c}$ when the value V becomes smallest, an average $(d_{2a} + d_{4b} + d_{6c})/3$ is calculated and it is roughly taken as the film thickness to be measured.

Depending on the film thickness $d_i$ to be measured, there is a possibility that the measured light reception signal R'($\lambda_i$) goes beyond the maximum value or minimum value of the reference output R($\lambda_i$) shown in the graph of FIG. 6. If this occurs, the calculation of film thickness $d_i$ according to equation (2) is unattainable. For convenience, therefore, the calculation is performed while taking the light reception signal R'($\lambda_i$) as the maximum or minimum value of the reference output R($\lambda_i$). At the stage of this first step, the film thickness $d_i$ is determined only by three wavelengths. The measurement precision is therefore low.

Subsequently, in a second step, for enhancement of measurement precision, the number of wavelengths is increased to six wavelengths $\lambda_i$ (i=1 to 6), including the three wavelengths in the first step. Around the rough film thickness $d_i$ obtained in the first step, the comparison range of combination is restricted the and calculation of equation (3) in the first step is performed, whereby the film thickness $d_i$ is calculated more exactly.

If the combination that minimizes the value V at the first step is $d_{2a}$, $d_{4b}$ and $d_{6c}$, then, concerning a, b and c, a table of values $d_{iN}'$, extended to the six wavelengths corresponding to Table 1 within the range of N'=N±2, is newly prepared. Table 2 below shows it.

TABLE 2

| N | R' ($\lambda_{1N}$) | R' ($\lambda_{2N}$) | R' ($\lambda_{3N}$) | R' ($\lambda_{4N}$) | R' ($\lambda_{5N}$) | R' ($\lambda_{6N}$) |
|---|---|---|---|---|---|---|
| N − 2 | $d_{1N-2}$ | $d_{2N-2}$ | $d_{3N-2}$ | $d_{4N-2}$ | $d_{5N-2}$ | $d_{6N-2}$ |
| N − 1 | $d_{1N-1}$ | $d_{2N-1}$ | $d_{3N-1}$ | $d_{4N-1}$ | $d_{5N-1}$ | $d_{6N-1}$ |
| N | $d_{1N}$ | $d_{2N}$ | $d_{3N}$ | $d_{4N}$ | $d_{5N}$ | $d_{6N}$ |
| N + 1 | $d_{1N+1}$ | $d_{2N+1}$ | $d_{3N+1}$ | $d_{4N+1}$ | $d_{5N+1}$ | $d_{6N+1}$ |
| N + 2 | $d_{1N+2}$ | $d_{2N+2}$ | $d_{3N+2}$ | $d_{4N+2}$ | $d_{5N+2}$ | $d_{6N+2}$ |

From Table 2 and in correspondence with equation (3) at the first step, and in accordance with an equation below, an average of those values $d_{1N}' - d_{6N}'$ with which the value V' becomes smallest is calculated, and it is taken as an exact film thickness value to be measured.

$$V'(a', b', c', e', f', g') = (d_{1a}' - d_{2b}')^2 + (d_{1a}' - d_{3c}')^2 + (d_{1a}' - d_{4e}')^2 + (d_{1a}' - d_{5f}')^2$$
$$+ (d_{1a}' - d_{6g}')^2 + (d_{2b}' - d_{3c}')^2 + (d_{2b}' - d_{4e}')^2 + (d_{2b}' - d_{5f}')^2 + (d_{2b}' - d_{6g}')^2 + (d_{3c}' - d_{4e}')^2$$
$$+ (d_{3c}' - d_{5f}')^2 + (d_{3c}' - d_{6g}')^2 + (d_{4e}' - d_{5f}')^2 + (d_{4e}' - d_{6g}')^2 + (d_{5f}' - d_{6g}')^2 \quad (4)$$

Figure 7:
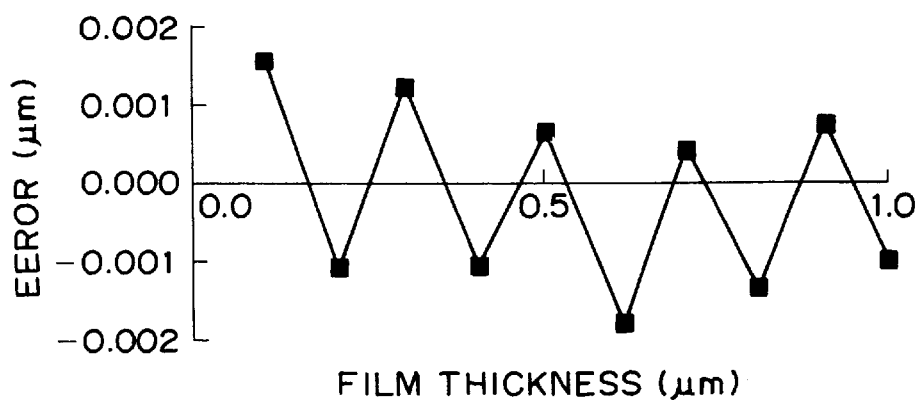
FIG. 7 is a graph of film thickness measurement precision.
Figure 8:
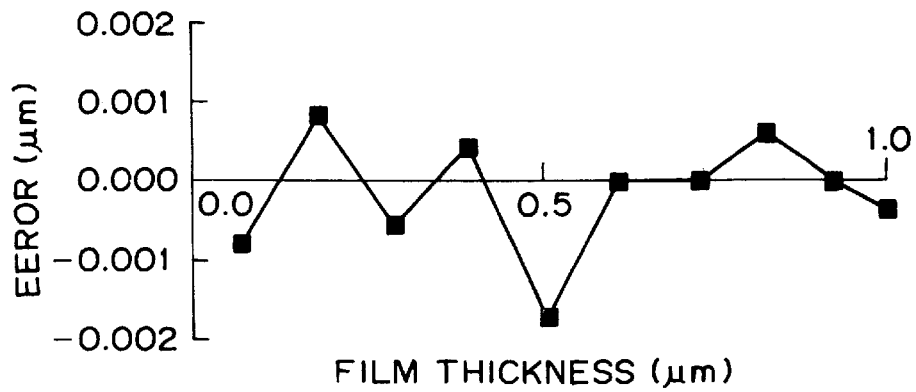
FIG. 8 is a graph of film thickness measurement precision.

FIG. 7 shows the results of measurement precision as determined through the film thickness measurement in the first step, by using a sample comprising a substrate W of Si and a film layer f of $SiO_2$. FIG. 8 shows the measurement result in the second step. Both of FIGS. 7 and 8 concern the measurement precision in a case where there is a measurement error of 0.2% in the measured light reception signal R'($\lambda_i$) with respect to the reference output R($\lambda_i$) of the light reception signal. It is seen that the measurement precision increases notably after the second step where the number of wavelengths is increased. Thus, by performing the film thickness measurement through the first and second steps as described, a film thickness value can be measured wit high precision, with the film thickness calculation time reduced, regardless the of increased number of wavelengths.

Figure 9:
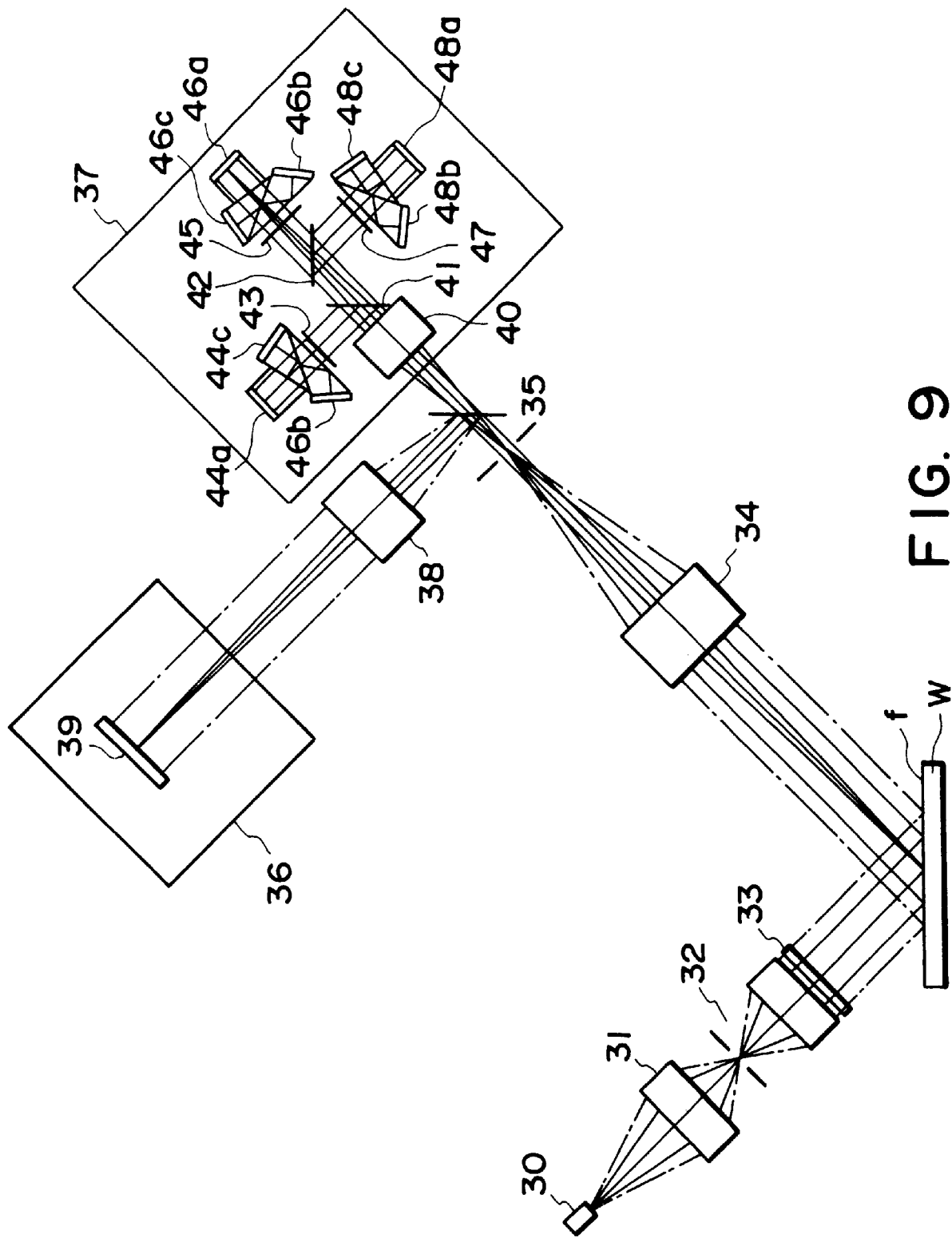
FIG. 9 is a schematic view of a film thickness measuring apparatus according to a second embodiment of the present invention.

FIG. 9 is a schematic view of a film thickness measuring apparatus according to a polarization analysis method, in a second embodiment of the present invention. Along a light path extending from an optical fiber 30 connected to a white light source (not shown) and toward a substrate W having a film layer f, which light path extends in a direction inclined by an angle θ, there are two condenser lenses 31 and 32, and a polarizer 33 having a polarization direction of 45 deg. Along a light path of reflection light from the substrate W, which extends similarly in an inclined direction, there are an objective lens 34 and a half mirror 35. In the direction of light reflection by the half mirror 35, there is a position detecting system 36. In the direction of light transmission, there is a film thickness measuring system 37.

The position detecting system 36 comprises an imaging lens 38 and a CCD light-receiving element 39 of a two-dimensional array. The film thickness measuring system 37 comprises an imaging lens 40 and half mirrors 41 and 42. By these two half mirrors 41 and 42, the light path is branched into three directions. In the direction of light reflection by the half mirror 41, there are an analyzer 43 with a zero (0) degree orientation, and a tricolor separation optical element having CCD light-receiving elements 44a, 44b and 44c of a two-dimensional array, for separating the light into three wavelengths $\lambda_i$ (i=1 to 3). Also, in the direction of light transmission by the half mirror 42 which is behind the half mirror 41, there are an analyzer 45 with zero (0) degree orientation, and a similar tricolor separation optical element having CCD light receiving elements 46a, 46b and 46c. In the direction of light reflection by the half mirror 42, there are an analyzer 47 with a 90 degree orientation, and a similar tricolor separation optical element having CCD light receiving elements 48a, 48b and 48c.

The light emitted from the white light source is directed by the optical fiber 30 into the illumination optical system. Then, the light goes through the condenser lenses 31 and 32 and, by means of the polarizer 33, it is transformed into rectilinearly polarized light having a polarization direction of 45 deg. Then, it illuminates a predetermined region on the substrate W surface, with an incidence angle θ.

Reflection light from the predetermined region on the substrate W having a film layer f formed thereon, goes through the objective lens 34 and is reflected by the half mirror 35. Then, within the position detecting system 36, the light is imaged by the imaging lens 38 upon the CCD light receiving element 39 of a two-dimensional array, in accordance with Scheinmpflug's condition. This two-dimensional image is displayed on the TV monitor, such as shown in FIG. 3. For a determination of a position (Xm, Ym) or a region S suitable for film thickness measurement, from the two-dimensional image, the position is designated by moving the cursor K, for example, in the monitor display Reflection light from the predetermined region on the substrate W is changed into elliptically polarized light due to the structure of the film layer f. This elliptically polarized light passes through the objective lens 34 and the half mirror 35, and it is directed into the film thickness measuring system 37. In the film thickness measuring system 37, the light reflected from the predetermined region on the substrate W surface goes through the imaging lens 40 and, by means of the two half mirrors 41 and 42, it is branched into three paths. In these light paths, the lights are received by the analyzers 43, 45 and 47 of zero deg., 45 deg. and 90 deg., respectively, whereby the direction is separated. Then, through the tricolor separation optical elements each for separating light into three wavelengths $\lambda_i$ (i=1 to 3), the lights are imaged upon the CCD light receiving elements 44a–44c, 46a–46c and 48a–48c of two-dimensional array, respectively, in accordance with Scheinmpflug's condition.

Figure 10:
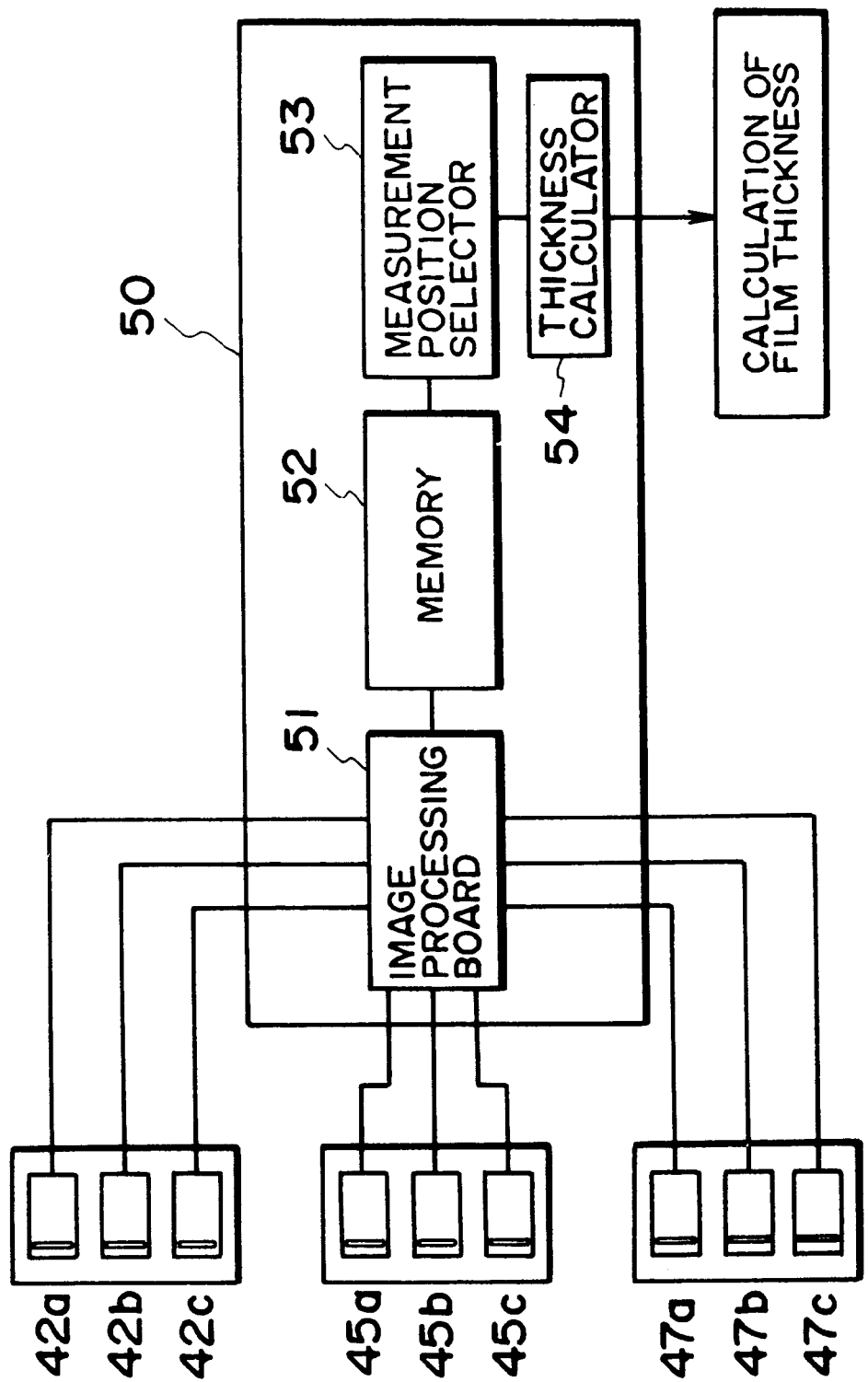
FIG. 10 is a block diagram of information processing in a film thickness measuring system.

FIG. 10 is a block diagram of information processing in the film thickness measuring system 37. The outputs of the CCD light receiving elements 44a–44c, 46a–46c and 48a–48c are connected to an image processing board 51 of a host computer 50, a film thickness measurement image memory 52 of external storing means, a film thickness measurement suitable position selecting device 53 of image processing means, and a film thickness measuring and calculating device 54, sequentially in this order, whereby the film thickness is calculated.

Two-dimensional imagewise information as imaged upon the CCD light receiving elements 44a–44c, 46a–46c, 48a–48c of a two-dimensional array in relation to the analyzers 43, 45 and 47, respectively, and with respect to the wavelengths $\lambda_i$ (i=1 to 3), respectively, is stored into the film thickness measurement image memory 52 of the external storing means of the host computer 50, through the image processing board 51 for the film thickness measuring process.

Subsequently, from the thus stored two-dimensional imagewise information and on the basis of the position (Xm, Ym) or the coordinates of the region S suitable for the film thickness measurement as obtained in the position detecting process, the film thickness measuring and calculating means 54 calculates the film thickness value by using light reception signals of corresponding picture elements.

Initially, in a first step, with respect to the different wavelengths $\lambda_i$ (i=1 to 3), the film thickness measuring and calculating means 54 compares a first correlation table, showing the theoretical relation between the film thickness value and the reflection amplitude ratio and phase difference of P and S polarized lights, with the reflection amplitude ratio and phase difference of P and S polarized lights as calculated from the light reception signals actually measured in relation to these wavelengths, to thereby determine plural solutions for the film thickness value. Then, among these solutions, a combination of those solutions having the closest values is selected and, on the basis of the thus selected combination of film thickness solutions, the film thickness value of the film layer f is roughly determined.

Then, in a second step, a second correlation table that shows the theoretical relation between the film thickness and the reflection amplitude ratio and phase difference of P and S polarized lights, with respect to different wavelengths, in the unit of narrower film thickness intervals as compared with the first correlation table, is prepared. By using the approximate film thickness obtained in the first step as a reference, the range of comparison is narrowed and, in a similar way as the first step, the values of reflection amplitude ratio and phase difference of the P and S polarized lights as calculated from the light reception signals actually measured with respect to theses wavelengths, respectively, are compared with the second correlation table, whereby the film thickness is determined exactly.

In the first step, from the two-dimensional imagewise information thus measured in relation to the three wavelengths $\lambda_i$ (i=1 to 3) and on the basis of the light reception signals corresponding to picture elements of an average of imagewise signals at the position (Xm, Ym) or in the region S suitable for film thickness measurement as selected and determined in the position detecting process, reflection amplitude ratio tan $\phi_i$ and the phase difference $\Delta_i$ of P and S polarized light with respect to these wavelengths, respectively, are calculated.

In the case of wavelength $\lambda_i$, for example, regarding the CCD light receiving elements 44a, 46a and 48a of two-dimensional array of the film thickness measuring system 37, if $H_1$ and $H_2$ are expressed as follows, assuming that the light reception signals of the analyzers of zero deg., 45 deg. and 90 deg. are denoted by $I_0$, $I_{45}$ and $I_{90}$, respectively:

$$H_1 = (I_0 - I_{90})/(I_0 + I_{90})$$

$$H_2 = (2 \cdot I_{45})/(I_0 + I_{90}) - 1$$

then, the reflection amplitude ratio tan $\phi_i$ and phase difference $\Delta_i$ are given by the following equations:

$$\tan \phi_i = \{(1+H_1)/(1-H_1)\}^{2/1} \quad (5)$$

$$\Delta_i = \tan^{-1}\{(1-H_1^2-H_2^2)^{1/2}/H_2\} \quad (6)$$

The first correlation table that shows the theoretical relation between the film thickness $d_{ik}$ and the reflection amplitude ratio tan $\phi_{ik}$ and phase difference $\Delta_{ik}$ of P and S polarized lights, is such as shown in Table 3 to Table 5, below.

TABLE 3

| $d_{1k}$ | $\tan\phi_{1k}$ | $\Delta_{1k}$ |
|---|---|---|
| $d_{11}$ | $\tan\phi_{11}$ | $\Delta_{11}$ |
| $d_{12}$ | $\tan\phi_{12}$ | $\Delta_{12}$ |
| $d_{13}$ | $\tan\phi_{13}$ | $\Delta_{13}$ |
| $d_{14}$ | $\tan\phi_{14}$ | $\Delta_{14}$ |
| $d_{15}$ | $\tan\phi_{15}$ | $\Delta_{15}$ |
| $d_{16}$ | $\tan\phi_{16}$ | $\Delta_{16}$ |
| $d_{17}$ | $\tan\phi_{17}$ | $\Delta_{17}$ |
| $d_{18}$ | $\tan\phi_{18}$ | $\Delta_{18}$ |
| $d_{19}$ | $\tan\phi_{19}$ | $\Delta_{19}$ |
| $d_{110}$ | $\tan\phi_{110}$ | $\Delta_{110}$ |
| . | . | . |
| . | . | . |
| . | . | . |

TABLE 4

| $d_{2k}$ | $\tan\phi_{2k}$ | $\Delta_{2k}$ |
|---|---|---|
| $d_{21}$ | $\tan\phi_{21}$ | $\Delta_{21}$ |
| $d_{22}$ | $\tan\phi_{22}$ | $\Delta_{22}$ |
| $d_{23}$ | $\tan\phi_{23}$ | $\Delta_{23}$ |
| $d_{24}$ | $\tan\phi_{24}$ | $\Delta_{24}$ |
| $d_{25}$ | $\tan\phi_{25}$ | $\Delta_{25}$ |
| $d_{26}$ | $\tan\phi_{26}$ | $\Delta_{26}$ |
| $d_{27}$ | $\tan\phi_{27}$ | $\Delta_{27}$ |
| $d_{28}$ | $\tan\phi_{28}$ | $\Delta_{28}$ |
| $d_{29}$ | $\tan\phi_{29}$ | $\Delta_{29}$ |
| $d_{210}$ | $\tan\phi_{210}$ | $\Delta_{210}$ |
| . | . | . |
| . | . | . |
| . | . | . |

TABLE 5

| $d_{3k}$ | $\tan\phi_{3k}$ | $\Delta_{3k}$ |
|---|---|---|
| $d_{31}$ | $\tan\phi_{31}$ | $\Delta_{31}$ |
| $d_{32}$ | $\tan\phi_{32}$ | $\Delta_{32}$ |
| $d_{33}$ | $\tan\phi_{33}$ | $\Delta_{33}$ |
| $d_{34}$ | $\tan\phi_{34}$ | $\Delta_{34}$ |
| $d_{35}$ | $\tan\phi_{35}$ | $\Delta_{35}$ |
| $d_{36}$ | $\tan\phi_{36}$ | $\Delta_{36}$ |
| $d_{37}$ | $\tan\phi_{37}$ | $\Delta_{37}$ |
| $d_{38}$ | $\tan\phi_{38}$ | $\Delta_{38}$ |
| $d_{39}$ | $\tan\phi_{39}$ | $\Delta_{39}$ |
| $d_{310}$ | $\tan\phi_{310}$ | $\Delta_{310}$ |
| . | . | . |
| . | . | . |
| . | . | . |

In equations (5) and (6), while comparing with the reflection amplitude ratio $\tan\phi_{ik}$ and phase difference $\Delta_{ik}$ of P and S polarized lights with respect to different wavelengths within the first correlation table (Tables 3–5), discrimination is made to determine those values in the first correlation table to which the values of the reflection amplitude ratio $\tan\phi_i$ and phase difference $\Delta_i$ of P and S polarized lights with respect to different wavelengths as calculated from the light reception signals (measured values) are closest. This determination is made on the basis of a combination with which mutual difference of $T_1$, $T_2$ and $T_3$, below, becomes small.

$$T_1(k) = (\tan\phi_1 - \tan\phi_{1k})^2 + (\Delta_1 - \Delta_{1k})^2 \quad (7)$$

$$T_2(k) = (\tan\phi_2 - \tan\phi_{2k})^2 + (\Delta_2 - \Delta_{2k})^2 \quad (8)$$

$$T_3(k) = (\tan\phi_3 - \tan\phi_{3k})^2 + (\Delta_3 - \Delta_{3k})^2 \quad (9)$$

There may be different combinations with which the mutual difference becomes small and, in accordance with the following equation, the combination, by which the least square sum of the mutual difference in regard to $d_{1a}$, $d_{2b}$ and $d_{3c}$ (where $d_{1a}$, $d_{2b}$ and $d_{3c}$ are film thickness values with respect to different wavelengths and corresponding to the different combinations) is minimized, is determined.

$$V(a, b, c) = (d_{1a} - d_{2b})^2 + (d_{1a} - d_{3c})^2 + (d_{2b} - d_{3c})^2 \quad (10)$$

From the values $d_{1a}$, $d_{2b}$ and $d_{3c}$ when the value V becomes smallest, an average $(d_{1a} + d_{2b} + d_{3c})/3$ is calculated, and the result is roughly taken as the film thickness. In this first step stage, since the film thickness is determined in regard to the film thickness measurement range and on the basis of a correlation table with respect to certain rough film thickness intervals, the measurement precision is low.

Subsequently, at a second step, for enhancement of measurement precision, by using the roughly determined film thickness $d_a$ obtained in the first step as a reference, a second correlation table such as Tables 6–8, below, showing the theoretical relation between the film thickness value with respect to each wavelength and the reflection amplitude ratio $\tan\phi_{ik}$ and the phase difference $\Delta_{ik}$ of P and S polarized lights is prepared, with smaller film thickness intervals than in the first correlation table.

TABLE 6

| $d_k'$ | $\tan\phi_{1k}'$ | $\Delta_{1k}'$ |
|---|---|---|
| $d_a - \epsilon$ | $\tan\phi_{1a} - \epsilon$ | $\Delta_{1a} - \epsilon$ |
| . | . | . |
| . | . | . |
| . | . | . |

TABLE 6-continued

| . | . | . |
|---|---|---|
| $d_a$ | $\tan\phi_{1a}$ | $\Delta_{1a}$ |
| . | . | . |
| . | . | . |
| . | . | . |
| $d_a + \epsilon$ | $\tan\phi_{1a} + \epsilon$ | $\Delta_{1a} + \epsilon$ |

TABLE 7

| $d_k'$ | $\tan\phi_{2k}'$ | $\Delta_{2k}'$ |
|---|---|---|
| $d_a - \epsilon$ | $\tan\phi_{2a} - \epsilon$ | $\Delta_{2a} - \epsilon$ |
| . | . | . |
| . | . | . |
| . | . | . |
| $d_a$ | $\tan\phi_{2a}$ | $\Delta_{2a}$ |
| . | . | . |
| . | . | . |
| . | . | . |
| $d_a + \epsilon$ | $\tan\phi_{2a} + \epsilon$ | $\Delta_{2a} + \epsilon$ |

TABLE 8

| $d_k'$ | $\tan\phi_{3k}'$ | $\Delta_{3k}'$ |
|---|---|---|
| $d_a - \epsilon$ | $\tan\phi_{3a} - \epsilon$ | $\Delta_{3a} - \epsilon$ |
| . | . | . |
| . | . | . |
| . | . | . |
| $d_a$ | $\tan\phi_{3a}$ | $\Delta_{3a}$ |
| . | . | . |
| . | . | . |
| . | . | . |
| $d_a + \epsilon$ | $\tan\phi_{3a} + \epsilon$ | $\Delta_{3a} + \epsilon$ |

By using the approximate film thickness $d_a$ obtained at the first step as a reference, the range $d_k'$ of film thickness value, which is the comparison range, is restricted to $d_a \pm \epsilon$, for example. Then, while comparing with the reflection amplitude ratio $\tan\phi_{ik}$ and phase difference $\Delta_{ik}$ of P and S polarized lights with respect to different wavelengths within the second correlation table (Tables 6–8), a discrimination is made to determine those values in the second correlation table to which the values of reflection amplitude ratio $\tan\phi_i$ and phase difference $\Delta_i$ of P and S polarized lights with respect to different wavelengths as calculated from the light reception signals (actually measured values) are closest. This determination is made on the basis of a combination with which mutual difference of $T_1'$, $T_2'$ and $T_3'$, below, becomes small.

$$T_1'(k') = (\tan\phi_1 - \tan\phi_{1k}')^2 + (\Delta_1 - \Delta_{1k}')^2 \quad (11)$$

$$T_2'(k') = (\tan\phi_2 - \tan\phi_{2k}')^2 + (\Delta_2 - \Delta_{2k}')^2 \quad (12)$$

$$T_3'(k') = (\tan\phi_3 - \tan\phi_{3k}')^2 + (\Delta_3 - \Delta_{3k}')^2 \quad (13)$$

There may be different combinations with which the mutual difference becomes small and, in accordance with the following equation, the combination by which the least square sum of the mutual difference, in regard to $d_{1a}'$, $d_{2b}'$ and $d_{3c}'$ (where $d_{1a}'$, $d_{2b}'$ and $d_{3c}'$ are film thickness values with respect to different wavelengths and corresponding to the different combinations) is minimized, is determined.

$$V(a', b', c') = (d_{1a}' - d_{2b}')^2 + (d_{1a}' - d_{3c}')^2 + (d_{2b}' - d_{3c}')^2 \quad (14)$$

From the values $d_{1a}'$, $d_{2b}'$ and $d_{3c}'$ when the value V' becomes smallest, an average $(d_{1a}' + d_{2b}' + d_{3c}')/3$ is calculated, and the result is taken as the exact film thickness.

Figure 11:
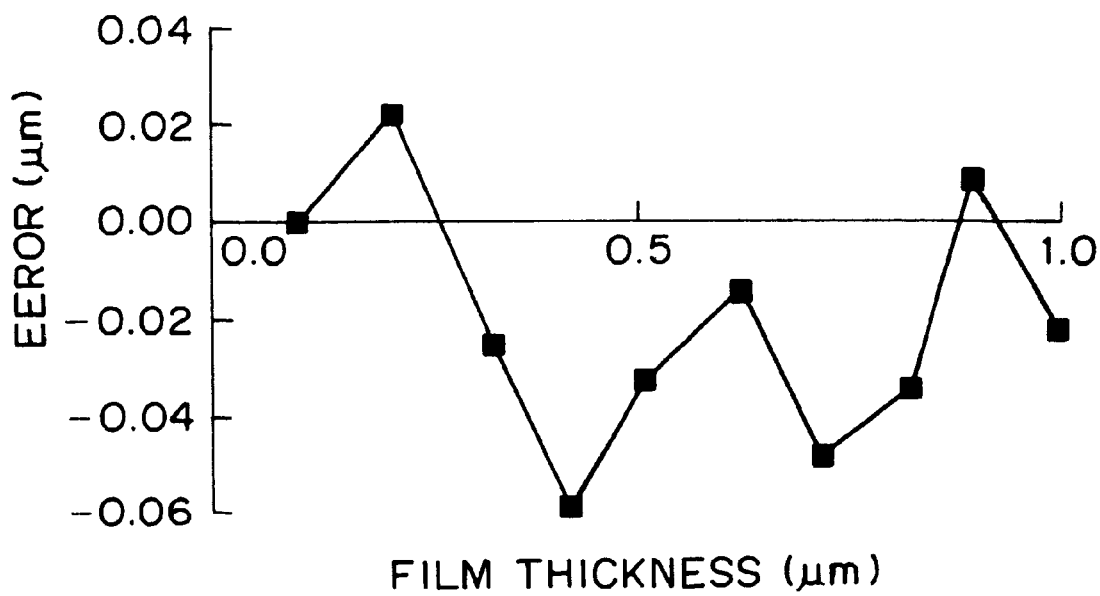
FIG. 11 is a graph of film thickness measurement precision.
Figure 12:
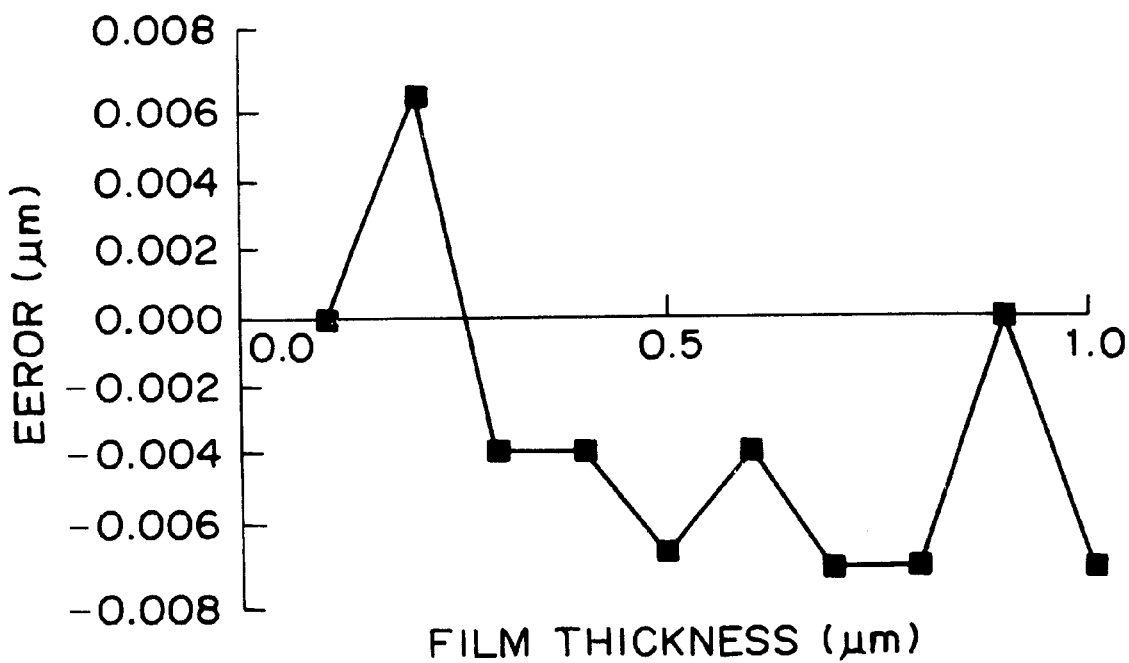
FIG. 12 is a graph of film thickness measurement precision.

FIG. 11 shows the results of film thickness measurement obtained in the first step, by using a sample comprising a substrate W of Si and a film layer f of $SiO_2$. FIG. 12 shows the results of film thickness measurement in the second step where the number of wavelengths used is larger than that of the FIG. 11 case. Both of FIGS. 11 and 12 concern the results of measurement precision in a case where there is a measurement error of 0.2% in the light reception signals $I_0$, $I_{45}$ and $I_{90}$ with respect to the reference outputs for theses light reception signals. From these drawings, it is seen that the measurement precision increases notably after the second step, as compared with that of FIG. 11. Thus, by doing the film thickness measurement through the first and second steps as described, the film thickness can be measured with high precision, with the film thickness calculation time being reduced.

In accordance with the first embodiment described above, an approximate film thickness value of the film layer on the substrate surface is determined from a combination of film thickness solutions, among plural solutions determined on the basis of light reception signals corresponding to at least three wavelengths. Then, for the selection of a combination of solutions of, the closest film thickness values, among the film thickness values calculated with respect to respective wavelengths from the light reception signals of all the wavelengths, the range of selection is restricted by using the approximate film thickness value as a reference. This assures reduction of film-thickness calculation time and high precision-film thickness measurement.

In accordance with the second embodiment of the present invention as described above, the values of the reflection amplitude ratio and the phase difference of P and S polarized lights, calculated from the light reception signals actually measured with respect to different wavelengths, are compared with a first correlation table showing the theoretical relation between the film thickness with respect to the different wavelengths and the reflection amplitude ratio and phase difference of P and S polarized lights. Among plural solutions obtained therefrom, a combination of those solutions of film thickness of the closest values is selected and, by using it, the thickness of the film on the substrate surface is roughly determined. Then, values of the reflection amplitude ratio and the phase difference of P and S polarized lights, calculated from the light reception signals actually measured with respect to different wavelengths, are compared with a second correlation table showing the theoretical relation between the film thickness with respect to respective wavelengths, at smaller film thickness intervals as compared with the first correlation table, and the reflection amplitude ratio and the phase difference of P and S polarized lights, whereby the film thickness is determined. Here, by using the approximate film thickness value obtained in the first step as a reference, the comparison range is restricted, to thereby determine the exact film thickness. This assures reduction of film-thickness calculating time and high precision film-thickness measurement.

Figure 13:
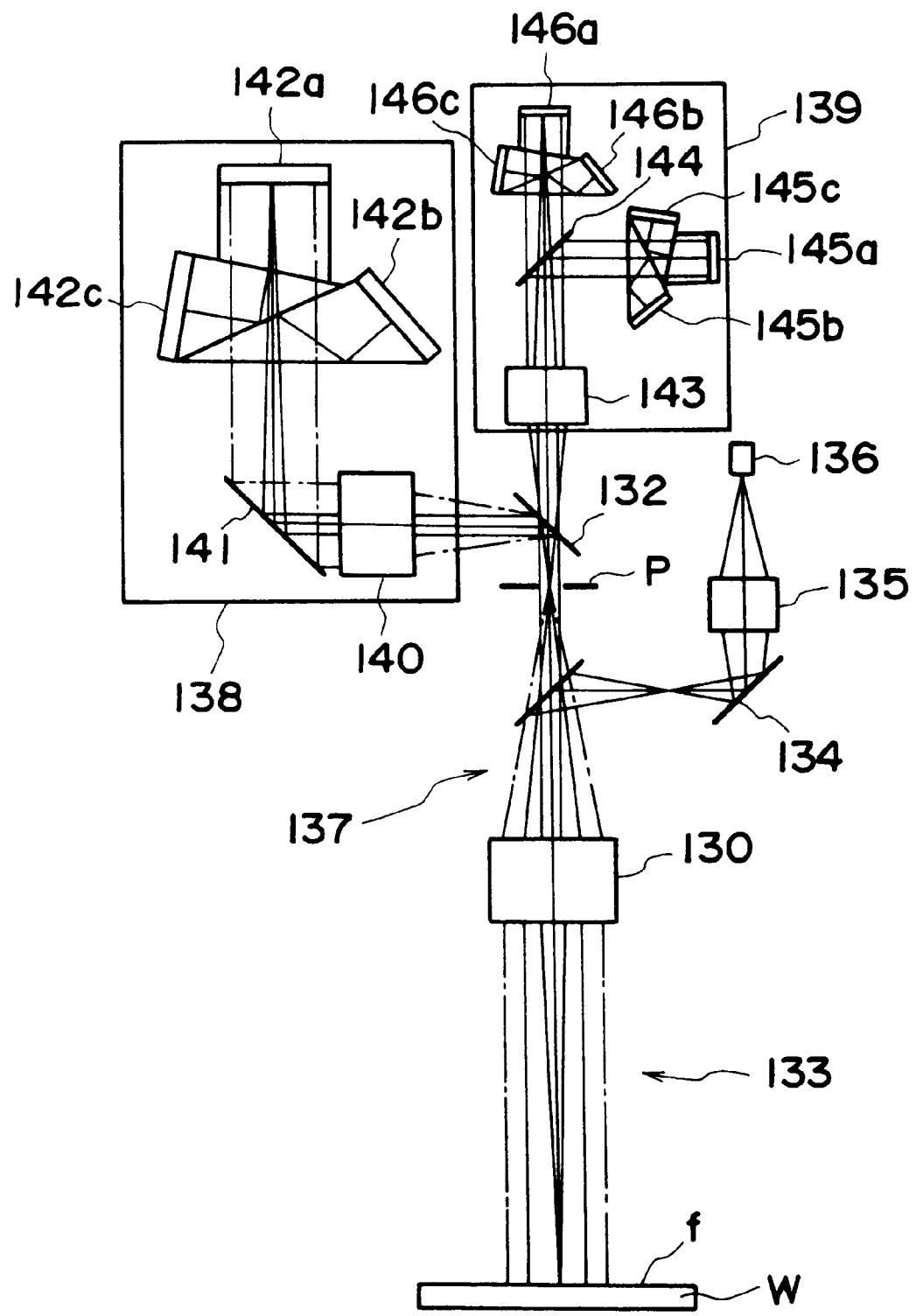
FIG. 13 is a schematic view of a film thickness measuring apparatus according to a third embodiment of the present invention.

FIG. 13 is a schematic view of a film thickness measuring apparatus based on the interference spectral reflectivity method, according to a third embodiment of the present invention. A substrate W has a film layer f formed on its surface, and it is moved by driving means (not shown). Disposed above the substrate W is an objective lens 130. Along the light path above the objective lens 130, there are a first half mirror 131 and a second half mirror 132. In the direction of light reception by the first half mirror 131, there is an illumination optical system 133 which comprises a mirror 134, a condenser lens 135 and an optical fiber 136, which is connected to a white light source (not shown), providing momentary light. The optical fiber 136 has its light exit surface disposed at a position optically conjugate with the exit pupil of the objective lens 130.

In the direction of light transmission by the first half mirror 131, there is an imaging optical system 137. The imaging optical system 137 is branched from the second half mirror 132. In the direction of light reflection by the half mirror 132, there is a position detecting and focusing system 138 for detecting a predetermined region on the substrate W surface. In the direction of light transmission, on the other hand, there is a film thickness measuring system 139 for measuring the thickness of the film.

The position detecting and focusing system 138 comprises an imaging lens 140, a mirror 141 and CCD light receiving elements 142a–142c of a two-dimensional array. These CCD light receiving elements 142a–142c are placed at different positions, for selection of an optimum image of a good imaging state in the position detecting and focusing system 138 and for determination of the position suitable for film thickness measurement with respect to this image. As illustrated, a stop P is disposed at the pupil position between the objective lens 131 and the position detecting and focusing system 138. Thus, the structure provides a telecentric system.

Figure 14:
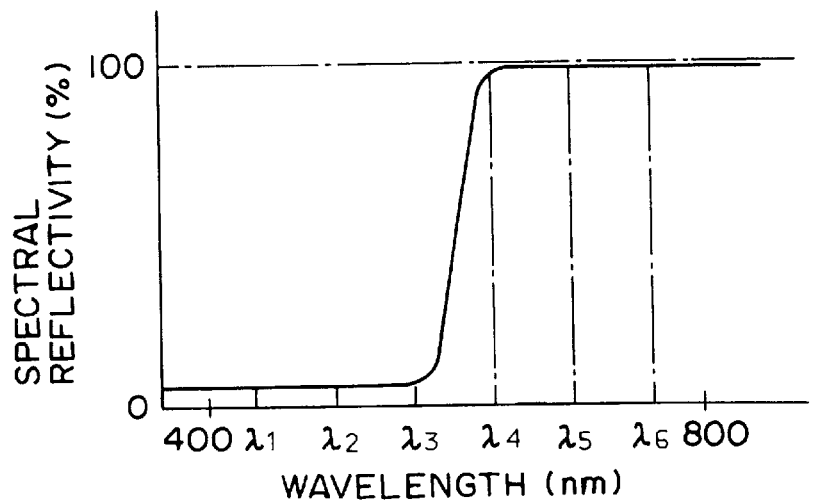
FIG. 14 is a graph of spectral reflectivity.

On the other hand, the film thickness measuring system 139 comprises an imaging lens 143 and a dichroic mirror 144, which has a characteristic such as shown in FIG. 14, for separating a first wavelength region, including wavelengths $\lambda_i$ (i=1 to 3), and a second wavelength region including wavelengths $\lambda_i$ (i=4 to 6) from each other. In the direction of light reflection by the dichroic mirror 144, there is a tricolor separation optical element having CCD light receiving elements 145a, 145b and 145c of a two-dimensional array, for separately receiving the wavelengths $\lambda_i$ (i=1 to 3) in the first wavelength region. In the direction of light transmission by the dichroic mirror 144, there is a similar tricolor separation optical element having CCD light receiving elements 146a, 146b and 146c of a two-dimensional array, for separately receiving the wavelengths $\lambda_i$ (i=4 to 6) of the second wavelength region.

Figure 15:
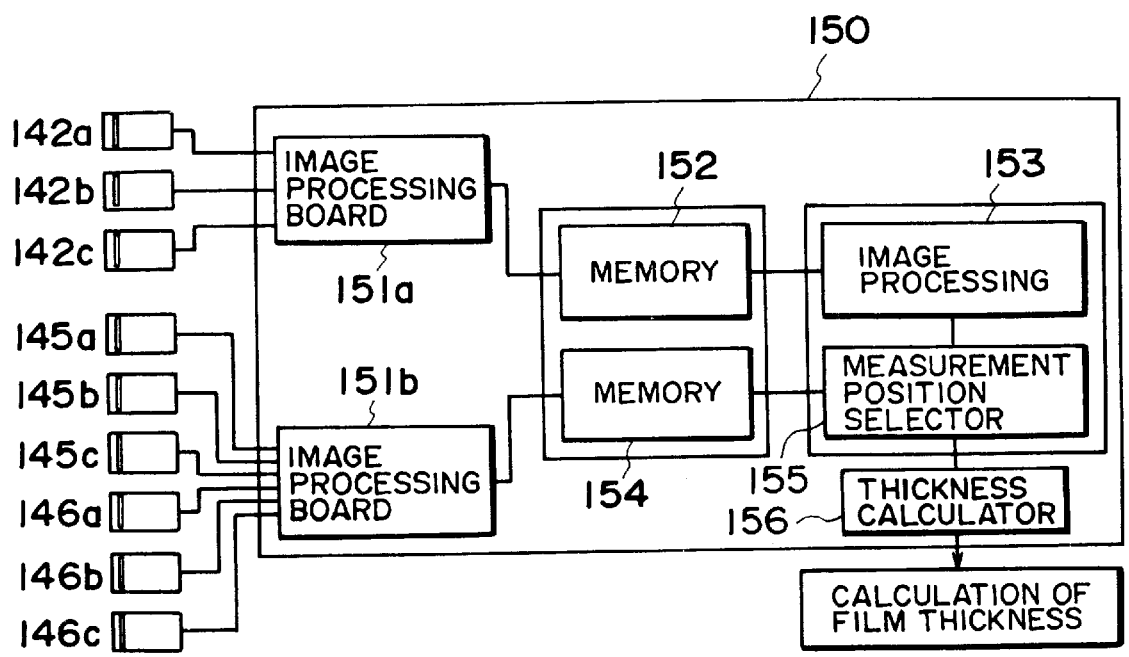
FIG. 15 is a block diagram of information processing in a position detecting system and a film thickness measuring system.

FIG. 15 is a block diagram of a host computer for performing information processing in relation to the light reception signals of the CCD light receiving elements 142a–142c, 145a–145c and 146a–146c. The outputs of the CCD light receiving elements 142a–142c of the position detecting and focusing system 138 are connected to an image processing board 151a of the host computer 150, a position detection image memory 152 of external storing means, and a position detection image processing device 153 of image processing means, sequentially in this order. The outputs of the CCD light receiving elements 145a–145c and 146a–146c of the film thickness measuring system 139 are connected to an image processing board 151b of the host computer 150, a film thickness measurement image memory 154 of external storing means, a film thickness measurement suitable position selecting device 155 of image processing means, sequentially in this order. Within the image processing means, the output of the position detection image processing device 153 is connected to the film thickness measurement suitable position selecting device 155, while the output of the film thickness measurement suitable position selecting device 155 is connected to film thickness measuring and calculating means 156, whereby the film thickness is calculated.

The light emitted from the white light source, providing momentary light, is directed by the optical fiber 136 into the illumination optical system and, through the condenser lens 135, mirror 134, half mirror 131 and objective lens 130, it is projected on the film layer f within a predetermined region on the substrate W surface, substantially at a right incidence angle.

The light reflected by the surface of the film layer f and the light reflected by the bottom of the film layer f, which is the interface with the substrate W surface, are directed to the imaging optical system 137 including the objective lens 130 and imaging lenses 140 and 143. In the imaging optical system 137, the light reflected from the surface of the film layer f is branched by the half mirror 132. Within the position detecting and focusing system 138, it goes via the imaging lens 140 and the mirror 141, and it is imaged upon the CCD light receiving elements 142a–142c of two-dimensional array.

Figure 16:
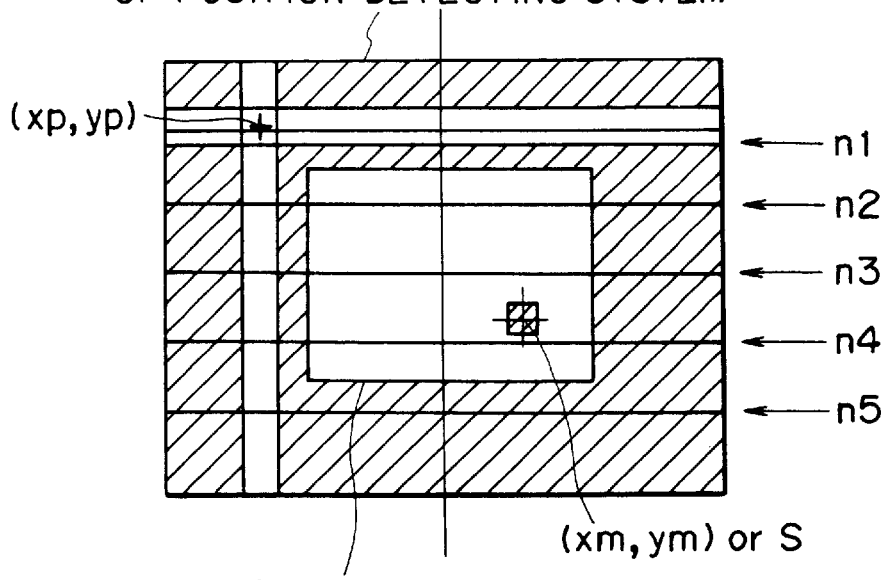
FIG. 16 is a schematic view for explaining a two-dimensional imagewise information range of a position detecting system.

A two-dimensional image, as received by the CCD light receiving elements 142a–142c, is displayed such as shown in FIG. 16. Through the image processing board 51a of the position detecting process, it is stored into the position detection image memory 52 of the external storage means of the host computer 50.

In these two-dimensional images, for discrimination of an image of good imaging state, first, the sampling lines $n_1$–$n_5$, such as is shown in FIG. 16, for determining the profile of light reception signal in the image sectional plane, are set. Then, within the position detection image processing device 153, from the image sectional plane profile information, light reception signal differences between adjacent picture element addresses i and j are detected. An image wherein an average of these differences is largest, is selected as the position detecting image.

Figure 17:
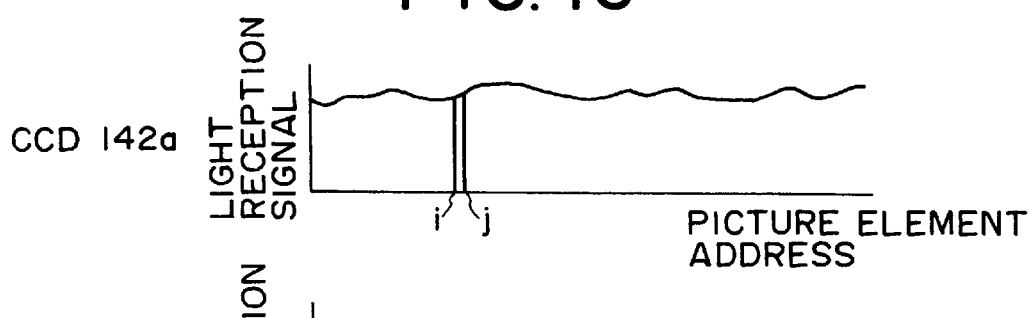
FIG. 17 is a graph of a sampling line.
Figure 17:
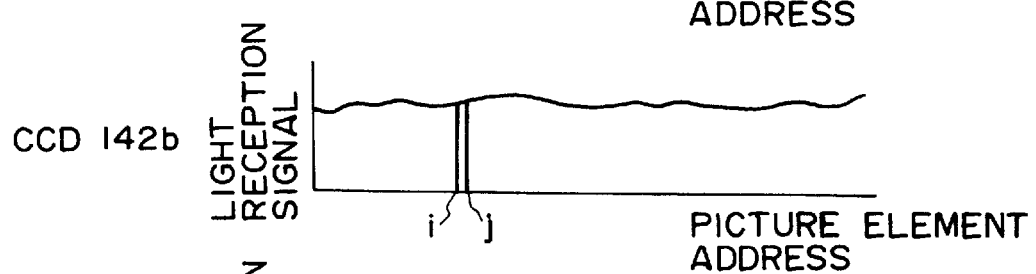
Figure 17:
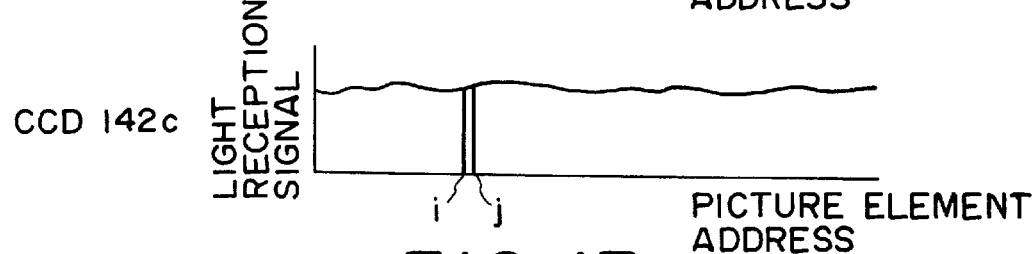
Figure 18:
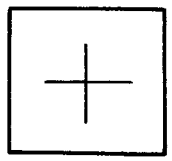
FIG. 18 is a schematic view for explaining a particular pattern or mark.

FIG. 17 illustrates the shapes of image sectional plane profiles, at the image sampling line $n_3$ corresponding to the CCD light receiving elements 142a–142c of two-dimensional array, provided at different positions. Among these profiles, the image of the CCD light receiving element 142a is selected. Then, out of the selected image, while using as a reference a particular pattern or mark for position detection, such as shown in FIG. 18, and being registered beforehand, the position detection image processing device 153 detects the position (Xp, Yp) within the two-dimensional image. Subsequently, since the relative position (Xm, Ym) or region S suitable for film thickness measurement with respect to the position of the particular pattern or mark is predetermined in accordance with the distribution of pattern layout upon the substrate W surface, the film thickness measurement suitable position (Xm, Ym) or region S is determined through the image processing within the film thickness measurement suitable position selecting device 155, with the coordinates being determined with reference to the position (Xp, Yp).

Subsequent to the above-described position detecting process, in the imaging optical system 137 the light passed through the half mirror 132 goes through the imaging lens 143 of the film thickness measuring system 139. By means of the dichroic mirror 144, it is separated into first and second wavelength regions. The path for the first wavelength region is divided separately for three wavelengths $\lambda_i$ (i=1 to 3), respectively. Also, the path for the second wavelength region is divided separately for three wavelengths $\lambda_i$ (i=4 to 6), respectively. Then, through respective tricolor separation optical elements, the lights are imaged upon the CCD light receiving elements 145a–145c and similarly upon the CCD light receiving elements 146a–146c, respectively.

Light beams of wavelengths $\lambda_i$ (i=1 to 6) have inherent interference spectral reflection intensities, with respect to the wavelengths and corresponding to the thickness of the film layer f. The interference spectral reflection intensities of respective wavelengths are stored, through the image processing board 151b of the film thickness measuring process, into the film thickness measurement image memory 154 of the external storing device of the host computer 150, in two-dimensional form.

Then, from the two-dimensional imagewise information stored with respect to each wavelength and in accordance with the coordinates of the film thickness measurement suitable position (Xm, Ym) or region S as determined in the position detecting process described above, the film thickness measuring and calculating means 56 calculates the film thickness by using the light reception signals of corresponding picture elements.

The manner of determining the film thickness in the film thickness measuring and calculating means 156 is essentially the same as that of the first embodiment, and a duplicate description therefor will be omitted here.

In accordance with this embodiment, since the range of two-dimensional imagewise information is set to a wide field, including a thickness measurement suitable position, even though the substrate W is relatively shifted to the film thickness measuring apparatus, there is no necessity of aligning the measurement position with a high precision. The use of illumination with momentary light effectively prevents lateral shift of the two-dimensional image. Thus, the position (Xm, Ym) or region S suitable for thickness measurement can be extracted accurately, and measurement can be done on the basis of it.

Figure 19:
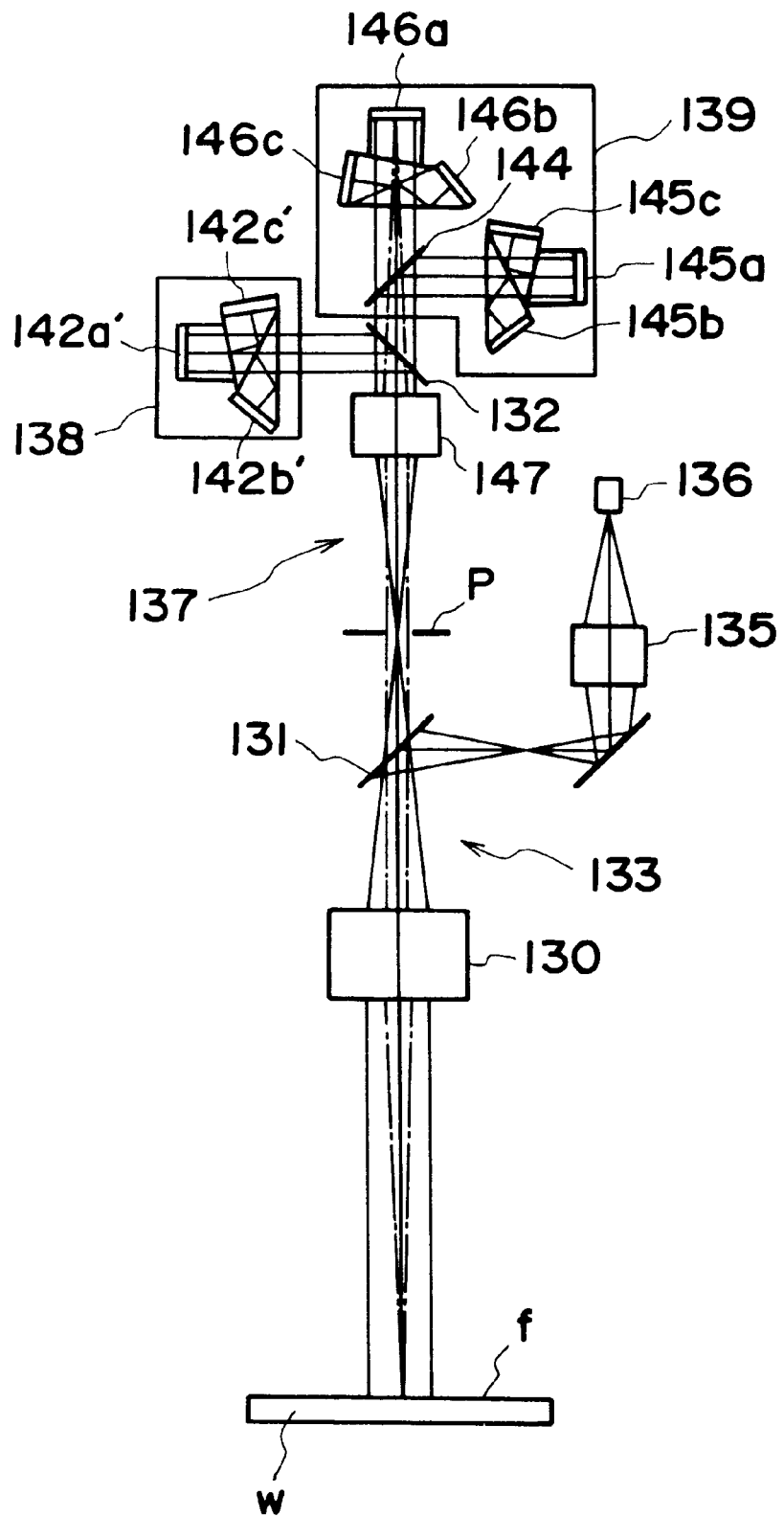
FIG. 19 is a schematic view of a modified form with an equalized two-dimensional imagewise information range.

FIG. 19 shows a modified form of the third embodiment, wherein CCD light receiving elements 142a'–142c' of the position detecting and focusing system 138 have approximately the same size as of the CCD light receiving elements 145a–145c and 146a–146c of the film thickness measuring system 139, and wherein a single imaging lens 147 is disposed between the half mirrors 131 and 132, in place of the imaging lenses 140 and 143. In this manner, depending on the condition of pattern layout on the substrate W, the range of two-dimensional imagewise information in the position detecting process may be made substantially equal to the range of two-dimensional imagewise information in the film thickness measuring process. In that case, in place of the particular pattern or mark, a pattern for the thickness measurement suitable position itself may be registered beforehand, and, on the basis of such pattern as a reference, the position (Xm, Ym) suitable for thickness measurement may be determined directly from two-dimensional imagewise information in the position detecting process.

The film thickness measuring method of this embodiment is particularly effective in a case where a pattern is formed within the film layer. However, it is applicable to a case where there is no pattern.

Figure 20:
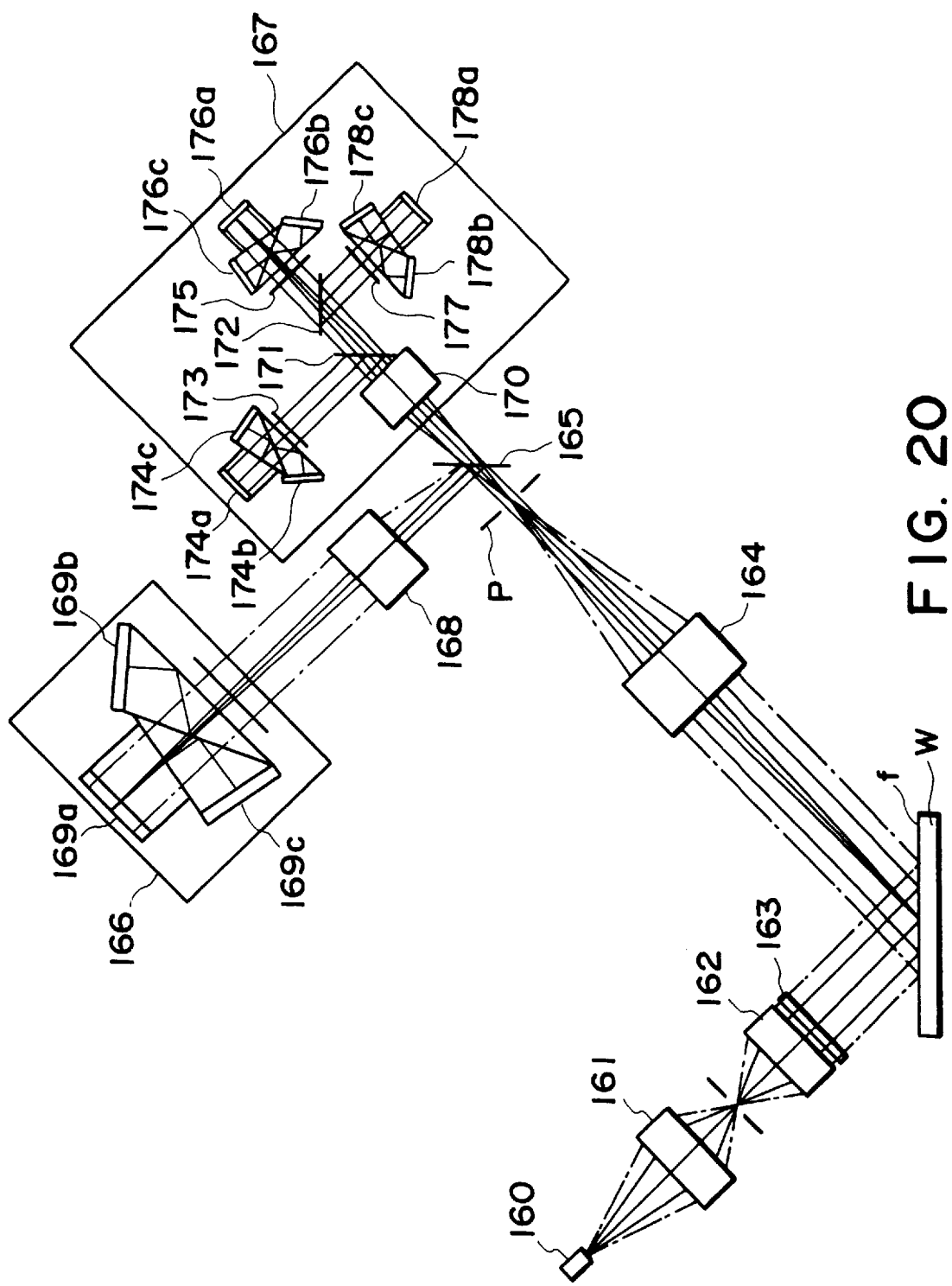
FIG. 20 is a schematic view of a film thickness measuring apparatus according to a fourth embodiment of the present invention.

FIG. 20 is a schematic view of a film thickness measuring apparatus based on a polarization analysis method, according to a fourth embodiment of the present invention. Disposed along a light path extending in a direction of angle θ from an optical fiber 160, connected to a white light source (not shown) which emits momentary light, to a substrate W having a film layer f, there are two condenser lenses 161 and 162 and a polarizer 163 having a direction of polarization of 45 deg. Along the light path of reflection light from the substrate W, extending similarly in an inclined direction, there are an objective lens 164 and a half mirror 165. In the direction of light reflection by the half mirror 165, there is a position detecting and focusing system 166. In the direction of light transmission by the half mirror 165, there is a film thickness measuring system 167.

The position detecting and focusing system 166 comprises an imaging lens 168 and CCD light receiving elements 169a–169c of two-dimensional array. These CCD light receiving elements 169a–169c are placed at different positions, for selection of an optimum image of a good imaging state in the position detecting and focusing system 166 and for determination of the position suitable for film thickness measurement with respect to this image. A stop P is disposed at the pupil position between the objective lens 164 and the position detecting and focusing system 166. Thus, the structure provides a telecentric system.

On the other hand, the film thickness measuring system 167 comprises an imaging lens 170 and half mirrors 171 and 172. By means of these half mirrors 171 and 172, the light path is branched into three directions. In the direction of light reflection by the half mirror 171, there are an analyzer 173 with a zero (0) degree orientation and a tricolor separation optical element having CCD light receiving elements 174a,174b and 174c of a two-dimensional array, for separating light into three wavelengths $\lambda_i$ (i=1 to 3). In the direction of light transmission by the half mirror 172 which is behind the half mirror 171, there are an analyzer 175 of a 45 degree orientation and a similar tricolor separation optical element having CCD light receiving elements 176a, 176b and 176c of a two-dimensional array. In the direction of light reflection by the half mirror 172, there are an analyzer 177 of a 90 degree orientation and a similar tricolor separation optical element having CCD light receiving elements 178a, 178b and 178c.

Figure 21:
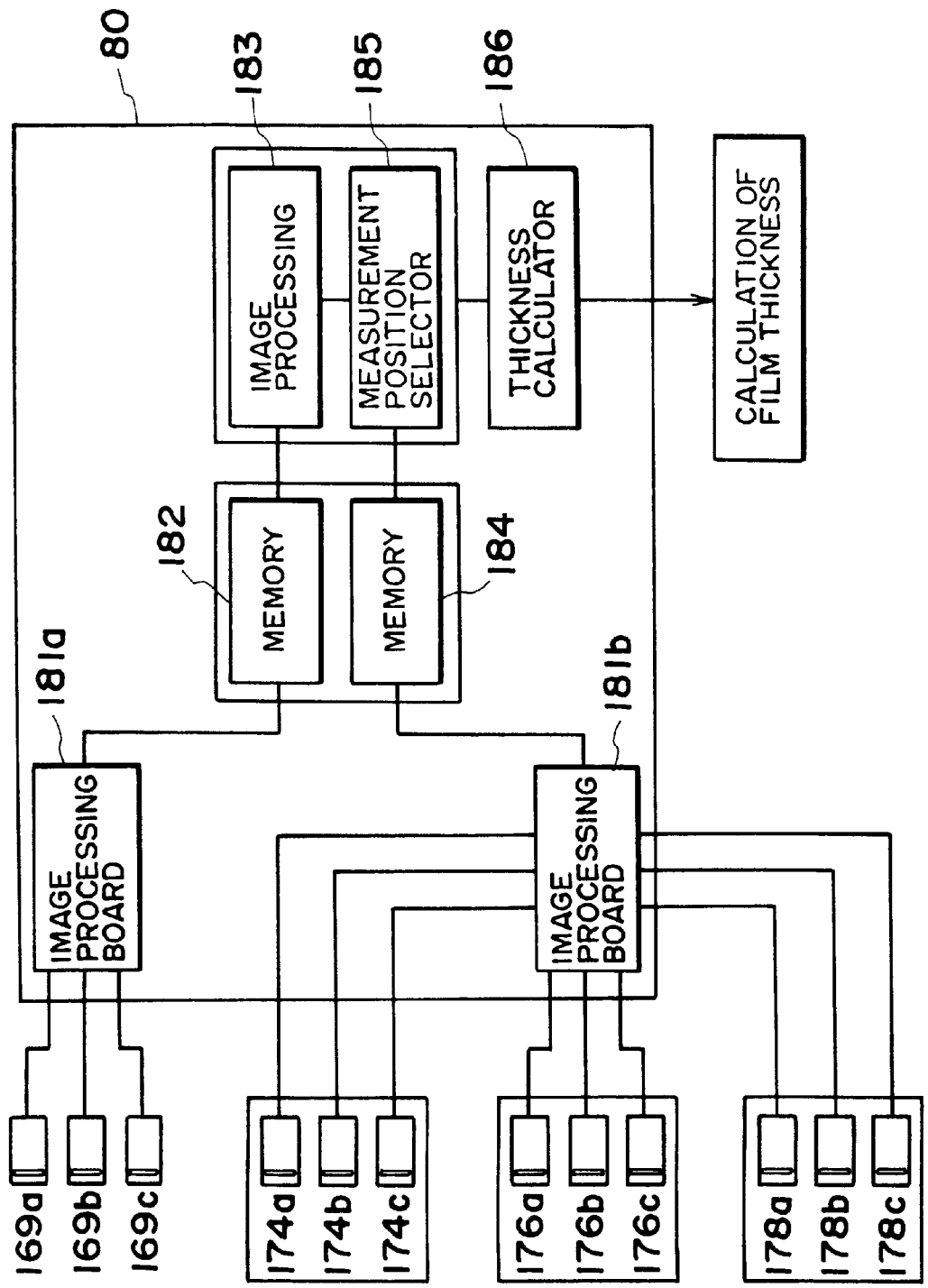
FIG. 21 is a block diagram of information processing in a position detecting system and a film thickness measuring system.

FIG. 21 is a block diagram of a host computer for performing information processing in relation to the light reception signals of the CCD light receiving elements 169a–169c, 174a–174c and 176a–176c. The outputs of the CCD light receiving elements 169a–169c of the position detecting and focusing system 166 are connected to an image processing board 181a of the host computer 180, a position detection image memory 182 of external storing means, and a position detection image processing device 183 of image processing means, sequentially in this order. The outputs of the CCD light receiving elements 174a–174c and 176a–176c of the film thickness measuring system 167 are connected to an image processing board 181b of the host computer 180, a film thickness measurement image memory 184 of external storing means, a film thickness measurement suitable position selecting device 185 of image processing means, sequentially in this order. Within the image processing means, the output of the position detection image processing device 183 is connected to the film thickness measurement suitable position selecting device 185, while the output of the film thickness measurement suitable position selecting device 185 is connected to film thickness measuring and calculating means 186, whereby the film thickness is calculated.

The light emitted from the white light source, providing momentary light, is directed by the optical fiber 160 into the illumination optical system. Then, through the condenser lenses 161 and 162, the light is transformed by the polarizer 163 into rectilinearly polarized light having a direction of polarization of 45 deg. It is projected on a predetermined region on the substrate W surface, at an incidence angle θ.

The light reflected from the predetermined region on the substrate W having the film layer f, goes through the objective lens 164 and is reflected by the half mirror 165. Then, in the position detecting and focusing system 166, the light is imaged upon the CCD light receiving elements 169a–169c of a two-dimensional array, in accordance with Scheinmpflug's condition.

A two-dimensional image as received by the CCD light receiving elements 169a–169c is displayed such as shown in FIG. 16. Through the image processing board 181a of the position detecting process, it is stored into the position detection image memory 182 of the external storage means of the host computer 180.

Like the third embodiment, for discrimination of an image of good imaging state, the sampling lines $n_1$–$n_5$ are set. Then, within the position detection image processing device 183, an image with which an average of light reception signal differences between adjacent picture element addresses i and j becomes largest, is selected as the position detecting image.

For example, in FIG. 17, the image of the CCD light receiving element 169b (142b) is selected. Then, while using as a reference a particular pattern or mark for position detection such as shown in FIG. 18, the position detection image processing device 183 detects the position (Xp, Yp) within the two-dimensional image. Subsequently, the film thickness measurement suitable position (Xm, Ym) or region S is determined by the film thickness measurement suitable position selecting device 185, with the coordinates being determined with reference to the position (Xp, Yp).

Subsequent to the above-described position detecting process, reflection light from the predetermined region on the substrate W changes into elliptically polarized light due to the structure of the film layer f. This elliptically polarized light passes through the objective lens 164 and the half mirror 165, and it is directed to the film thickness measuring system 167 to perform the film thickness measuring process.

In the film thickness measuring system 167, the light goes through the imaging lens 170 and, by means of the two half mirrors 171 and 172, it is branched into three paths. In these light paths, the lights are received by the analyzers 173, 175 and 177 of zero deg., 45 deg. and 90 deg., respectively, whereby the direction is separated. Then, through the tricolor separation optical elements each for separating light into three wavelengths $\lambda_i$ (i=1 to 3), the lights are imaged upon the CCD light receiving elements 174a–174c, 176a–176c and 178a–178c of two-dimensional array, respectively, of the film thickness measuring system 167, in accordance with Scheinmpflug's condition.

Two-dimensional imagewise information as imaged upon the CCD light receiving elements 174a–174c, 176a–176c, 178a–178c of two-dimensional array in relation to the analyzers 173, 175 and 177, respectively, and with respect to the wavelengths $\lambda_i$ (i=1 to 3), respectively, is stored into the film thickness measurement image memory 184 of the external storing means of the host computer 180, through the image processing board 181b for the film thickness measuring process.

Subsequently, from the thus stored two-dimensional imagewise information and on the basis of the position (Xm, Ym) or the coordinates of the region S suitable for the film thickness measurement as obtained in the position detecting process, the film thickness measuring and calculating means 186 calculates the film thickness value by using light reception signals of corresponding picture elements.

The manner of determining the film thickness in the film thickness measuring and calculating means 186 is essentially the same as that of the second embodiment, and a duplicate description therefor will be omitted here.

In accordance with this embodiment, since the range of two-dimensional imagewise information is set to a wide field, including a thickness-measurement suitable position, even though the substrate W is relatively shifted to the film-thickness measuring apparatus, there is no necessity of aligning the measurement position with a high precision. The use of illumination with momentary light effectively prevents lateral shift of two-dimensional image. Thus, the range of the region S or the position (Xm, Ym) suitable for thickness measurement can be extracted accurately, and measurement can be done on the basis of it.

Figure 22:
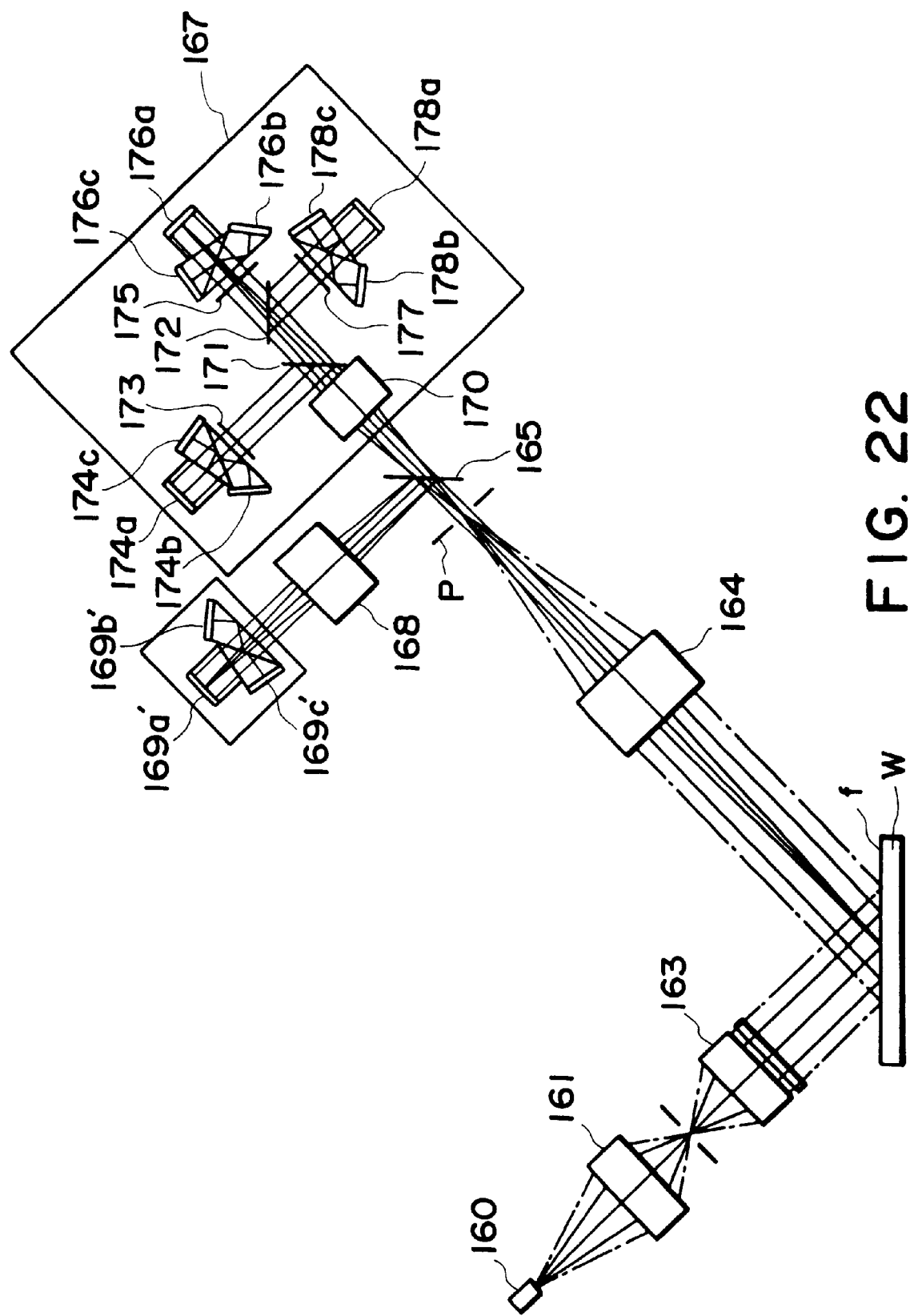
FIG. 22 is a schematic view of a modified form with an equalized two-dimensional imagewise information range.

FIG. 22 shows a modified form of the fourth embodiment, wherein CCD light receiving elements 169a'–169c' of the position detecting and focusing system 166 have approximately the same size as of the CCD light receiving elements 174a–174c and 176a–176c of the film thickness measuring system 167. In this manner, depending on the condition of pattern layout on the substrate W, the range of two-dimensional imagewise information in the position detecting process may be made substantially equal to that of the film thickness measuring process. In that case, in place of the particular pattern or mark, a pattern for the thickness measurement suitable position itself may be registered beforehand, and, on the basis of such pattern as a reference, the position (Xm, Ym) suitable for thickness measurement may be determined directly from two-dimensional imagewise information in the position detecting process.

The film thickness measuring method of this embodiment is particularly effective in a case where a pattern is formed within the film layer. However, it is applicable to a case where there is no pattern.

In accordance with the third and fourth embodiments of the present invention as described above, a position suitable for film thickness measurement is determined on the basis of two-dimensional imagewise information with respect to different wavelengths. On the basis of imagewise signals corresponding to this position, the film thickness of the film layer is measured. As a result of this, even if the substrate having the pattern formed in the film layer relatively moves at a high speed relative to the film thickness measuring apparatus, measurement can be done conveniently without the necessity of accurately aligning the film thickness measuring apparatus with respect to the measurement suitable position. Further, when measurement of the thickness of a film layer on a substrate surface is to be done for a wide range, measurement time can be shortened.

While the invention has been described with reference to the structures disclosed herein, it is not confined to the details set forth and this application is intended to cover such modifications or changes as may come within the purposes of the improvements or the scope of the following claims.

What is claimed is:

1. An apparatus for measuring the thickness of a film layer provided on a predetermined surface, said apparatus comprising:

a light source for producing light of different wavelengths for illuminating the predetermined surface;

a plurality of light receiving elements for receiving interference light of different wavelengths caused by the film layer on the predetermined surface, and for producing more than three light reception signals corresponding to the respective wavelengths; and computing means for providing solutions to a problem of computing a value for the film thickness, from the light reception signals corresponding to the respective wavelengths, wherein said computing means performs a first process for obtaining an approximate value for the film thickness by selecting solutions with the closest values from among solutions for the film thickness obtainable from at least three of the light reception signals corresponding to the respective wavelengths, and performs a second process for obtaining an exact value for the film thickness by selecting a combination of solutions with the closest values from among solutions for the film thickness obtainable from all the light reception signals corresponding to the respective wavelengths, and wherein said second process is performed on the basis of the approximate value and with a restricted range for selection of the combination.

2. An apparatus according to claim 1, wherein said computing means is operable, when the light reception signals corresponding to the respective wavelengths have a value beyond a theoretical maximum or minimum, to calculate solutions for the film thickness while replacing the light reception signals by the theoretical maximum or minimum.

3. An apparatus according to claim 1, further comprising a plurality of wavelength selecting optical elements for separating interference light caused by the film layer on the predetermined surface, into respective wavelengths, wherein lights as separated by said wavelength selecting optical elements are directed to the light receiving elements, respectively.

4. An apparatus according to claim 1, further comprising a system for displaying the predetermined surface on a monitor.

5. An apparatus according to claim 1, wherein the light receiving elements each comprises a CCD light receiving element of a two-dimensional array.

6. An apparatus according to claim 5, wherein the light reception signals corresponding to the respective wavelengths each comprises a light reception signal of a predetermined picture element of the CCD light receiving element.

7. An apparatus according to claim 6, wherein the output of the CCD light receiving element is once stored in two-dimensional form, and wherein said computing means calculates solutions for film thickness on the basis of light reception signals of predetermined picture elements in the stored output.

8. An apparatus for measuring the thickness of a film layer provided on a predetermined surface, said apparatus comprising:

a light source for producing light for illuminating the predetermined surface;

a plurality of light receiving elements for receiving interference light of different wavelengths caused by the film layer on the predetermined surface, and for outputting signals from which can be obtained information about a reflection amplitude ratio of perpendicularly polarized light and a phase difference of perpendicularly polarized light for different wavelengths; and computing means for providing a plurality of correlation tables correlating different film thickness intervals and the information related to the reflection amplitude ratio and phase difference of perpendicularly polarized light for different wavelengths, wherein said computing means performs a first process for determining an approximate value for the film thickness by selecting a combination of solutions with the closest values from among solutions to a problem of computing a value for the film thickness obtainable on the basis of the information related to the reflection amplitude ratio and phase difference of perpendicularly polarized light obtainable from the light receiving elements for different wavelengths and on the basis of a correlation table containing a first film thickness interval, and wherein said computing means performs a second process for obtaining an exact value for the film thickness by selecting a combination of solutions with the closest values from among solutions to the problem of computing a value for the film thickness obtainable on the basis of the information related to the reflection amplitude ratio and phase difference of perpendicularly polarized light obtainable from the light receiving elements for different wavelengths and on the basis of a correlation table containing a second film thickness interval smaller than the first film thickness interval, and wherein said second process is performed on the basis of the approximate value and with a restricted range for selection of the combination.

9. An apparatus according to claim 8, further comprising a polarization direction selecting optical element for separating interference light caused by the film layer on the predetermined surface with respect to the direction of polarization, and a plurality of wavelength selecting optical elements provided for different polarization directions and for separating light of different wavelengths, wherein lights as separated by said polarization direction selecting optical element and said wavelength selecting optical elements are directed to the light receiving elements, respectively.

10. An apparatus according to claim 8, further comprising a system for displaying the predetermined surface on a monitor.

11. An apparatus according to claim 8, wherein the light receiving elements each comprises a CCD light receiving element of a two-dimensional array.

12. An apparatus according to claim 11 wherein the information related to the reflection amplitude ratio and phase difference of perpendicularly polarized light corresponding to respective wavelengths is obtainable from an output of a predetermined picture element of the CCD light receiving element.

13. An apparatus according to claim 12, wherein the output of the CCD light receiving element is once stored in two-dimensional form, and wherein said computing means calculates solutions for film thickness value on the basis of a light reception signal of a predetermined picture element in the stored output.

14. A method of measuring the thickness of a film layer provided on a predetermined surface, said method comprising the steps of:
   detecting at least three light reception signals representing interference light of different wavelengths generated when the light illuminates the film layer on the predetermined surface;
   performing a first process for obtaining an approximate value for the film thickness by selecting a combination of solutions with the closest values from among solutions to a problem of computing a value for the film thickness obtainable from the at least three light reception signals corresponding to the different respective wavelengths; and
   performing a second process for obtaining an exact value of the film thickness by selecting a combination of solutions with the closest values from among solutions for the film thickness obtainable from all the light reception signals corresponding to the respective different wavelengths;
   wherein said second process is performed on the basis of the approximate value and with a restricted range for selection of the combination.

15. A method according to claim 14, wherein said detecting step includes the step of determining a measurement position or measurement region.

16. A method of measuring the thickness of a film layer provided on a predetermined surface, said method comprising the steps of:
   detecting reflection-amplitude-ratio information and perpendicularly-polarized light, phase-difference information of interference light of different wavelengths generated when light illuminates the film layer on the predetermined surface;
   performing a first process for determining an approximate value for the film thickness by selecting a combination of solutions, to the problem of computing the film thickness value, with the closest values from among solutions for the film thickness obtainable on the basis of the reflection-amplitude-ratio information and the perpendicularly-polarized-light phase-difference information of interference light of different wavelengths obtainable from light receiving elements and on the basis of a correlation table containing a first film thickness interval; and
   performing a second process for obtaining an exact value for the film thickness by selecting a combination of solutions with the closest values from among solutions for the film thickness obtainable on the basis of the reflection-amplitude-ratio information and the perpendicularly-polarized-light, phase-difference information of interference light of different wavelengths obtainable from the light receiving elements and on the basis of a correlation table containing a second film thickness interval smaller than the first film thickness interval;
   wherein said second process is performed on the basis of the approximate value and with a restricted range for selection of the combination.

17. A method according to claim 16, wherein said detecting step includes the step of determining a measurement position or a measurement region.

18. A method of measuring the thickness of a film layer provided on a predetermined surface, comprising the steps of:
   illuminating the predetermined surface;
   detecting two-dimensional images of different wavelengths about the predetermined surface;
   determining a measurement position on the predetermined surface by using the two-dimensional images of the different wavelengths; and
   measuring the thickness of the film layer on the basis of light reception information corresponding to the determined measurement position.

19. A method according to claim 18, wherein said position determining step includes the step of detecting a position of a particular pattern or mark within the two-dimensional image, and determining the measurement position on the basis of the position of the pattern or mark.

20. A method according to claim 18, wherein said thickness measuring step includes the step of detecting two dimensional imagewise information related to the predetermined surface, wherein a range for two-dimensional imagewise information detected is substantially equal to an image detection range for detection of the two-dimensional images corresponding to different wavelengths, respectively, and wherein said position determining step includes the step of determining the measurement position on the basis of the two-dimensional images corresponding to the wavelengths, respectively, while using a registered pattern as a reference.

21. A method according to claim 18, wherein said illuminating step is performed by using momentary light.

22. A method according to claim 18, further comprising the step of relatively moving the predetermined surface.

23. A method according to claim 18, wherein said position determining step includes the step of selecting an image, out of two-dimensional images corresponding to the wavelengths, respectively, in accordance with a state of imaging.

24. A method according to claim 18, wherein detection of the two-dimensional images in relation to the wavelengths, respectively, is performed through a telecentric optical system.

25. An apparatus for measuring the thickness of a film layer on a predetermined surface, comprising:
- a light source for producing light for illumination of the predetermined surface;
- a plurality of image pickup devices for detecting the predetermined surface illuminated with the light, as plural two-dimensional images of different wavelengths, respectively;
- computing means for determining a measurement position on the predetermined surface, on the basis of the two-dimensional images of the different wavelengths, respectively; and
- a thickness measuring system for measuring the thickness of the film layer on the basis of light reception information, among the light reception information, that corresponds to the determined measurement position.

26. An apparatus according to claim 25, wherein for determination of the measurement position, said computing means determines the measurement position on the basis of the detection of a position of a particular pattern or mark within the two-dimensional image and while using the pattern or mark position as a reference.

27. An apparatus according to claim 25, wherein said thickness measuring system detects two-dimensional information related to the predetermined surface, wherein the range of detected two-dimensional image information is substantially equal to the image detection range for the image pickup devices, and wherein, for determination of the measurement position, said computing means determines the measurement position on the basis of the two-dimensional images while using a registered pattern as a reference.

28. An apparatus according to claim 25, wherein said light source produces momentary light.

29. An apparatus according to claim 25, further comprising means for relatively moving the predetermined surface.

30. An apparatus according to claim 25, wherein, for determination of the measurement position, said computing means select an image, out of two-dimensional images related to the wavelengths, respectively, in accordance with a state of imaging.

31. An apparatus according to claim 25, further comprising a telecentric optical system operable for detection of the two-dimensional images in relation to the wavelengths, respectively.

* * * * *

UNITED STATES PATENT AND TRADEMARK OFFICE
CERTIFICATE OF CORRECTION

PATENT NO. : 6,137,575
DATED : October 24, 2000
INVENTOR(S) : Yasushi Sugiyama, et al.

It is certified that error appears in the above-identified patent and that said Letters Patent is hereby corrected as shown below:

Sheet No. 6 of the Drawings,
Figures 6 and 7, "EEROR" should read -- ERROR --.

Sheet No. 9 of the Drawings,
Figures 11 and 12, "EEROR" should read -- ERROR --.

Column 7,
Line 38, "the and" should read -- and the --.

Column 8,
Line 13, "wit" should read -- with --.
Line 67, "display" should read -- display. --.

Column 13,
Line 23, "of," should read -- of --.
Line 54, "of" should read -- of the --.

Column 21,
Line 49, "three" should read -- three of --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*